(12) United States Patent
Oishi

(10) Patent No.: US 9,606,762 B2
(45) Date of Patent: Mar. 28, 2017

(54) NON-TRANSITORY COMPUTER-READABLE RECORDING DEVICE STORING COMPUTER PROGRAM INCLUDING INSTRUCTIONS FOR CAUSING A DEVICE TO SELECT AN OBJECT DEVICE WITH WHICH THE DEVICE COMMUNICATES

(75) Inventor: Minoru Oishi, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 1070 days.

(21) Appl. No.: 13/247,492

(22) Filed: Sep. 28, 2011

(65) Prior Publication Data

US 2012/0075672 A1    Mar. 29, 2012

(30) Foreign Application Priority Data

Sep. 29, 2010  (JP) ................................. 2010-218595
Apr. 19, 2011  (JP) ................................. 2011-093376

(51) Int. Cl.
    *G06F 3/12*      (2006.01)
    *H04M 1/725*   (2006.01)
    (Continued)

(52) U.S. Cl.
    CPC .......... *G06F 3/1292* (2013.01); *G06F 3/1204* (2013.01); *G06F 3/1226* (2013.01);
    (Continued)

(58) Field of Classification Search
    CPC .... G06F 3/1285; G06F 3/1204; G06F 3/1236; G06F 3/1226; G06F 3/1292;
    (Continued)

(56) References Cited

U.S. PATENT DOCUMENTS 6,654,060 B1    11/2003   Kurosawa et al.
6,806,978 B1    10/2004   Tamura et al.
(Continued)

FOREIGN PATENT DOCUMENTS

JP    10-200790         7/1998
JP    2002-218503 A     8/2002
(Continued)

OTHER PUBLICATIONS

U.S. Appl. No. 13/247,483, filed Sep. 28, 2011.
(Continued)

*Primary Examiner* — Nicholas Pachol
(74) *Attorney, Agent, or Firm* — Scully, Scott, Murphy & Presser, P.C.

(57) ABSTRACT

A computer-readable recording device may store a computer program including instructions for causing a computer of a mobile device to operate as: (1) a first storing controlling module that causes a storing unit to store one or more first information for identifying one or more candidate devices, the one or more first information being received from a wireless network by a communication unit, (2) a sending controlling module that selects one candidate device as a temporarily selected candidate device from among the one or more candidate devices identified by the one or more first information, and controls the communication unit such that the communication unit sends a first instruction to the temporarily selected candidate device, and (3) a communication controlling module that controls the communication unit such that the communication unit communicates with the temporarily selected candidate device in a case where a predetermined condition is satisfied.

17 Claims, 15 Drawing Sheets

(51) Int. Cl.
*H04N 1/00* (2006.01)
*H04N 1/32* (2006.01)
*H04W 4/02* (2009.01)

(52) U.S. Cl.
CPC .......... *G06F 3/1236* (2013.01); *G06F 3/1285* (2013.01); *H04M 1/7253* (2013.01); *H04N 1/00244* (2013.01); *H04N 1/00278* (2013.01); *H04N 1/00307* (2013.01); *H04N 1/00347* (2013.01); *H04N 1/32523* (2013.01); *H04W 4/023* (2013.01); *H04W 4/026* (2013.01); *H04M 2250/02* (2013.01); *H04M 2250/06* (2013.01); *H04M 2250/10* (2013.01); *H04M 2250/12* (2013.01); *H04M 2250/64* (2013.01); *H04N 2201/0036* (2013.01); *H04N 2201/0039* (2013.01); *H04N 2201/0055* (2013.01)

(58) Field of Classification Search
CPC ........... H04M 1/7253; H04M 2250/10; H04M 2250/12; H04M 2250/06; H04M 2250/02; H04M 2250/64; H04W 4/023; H04W 4/026; H04N 1/32523; H04N 1/00347; H04N 1/00307; H04N 1/00244; H04N 1/00278; H04N 2201/0036; H04N 2201/0039; H04N 2201/0055
See application file for complete search history.

(56) References Cited

U.S. PATENT DOCUMENTS

| | | | |
|---|---|---|---|
| 7,054,920 B2 * | 5/2006 | Aoki et al. | 709/218 |
| 7,190,471 B2 * | 3/2007 | Sandfort et al. | 358/1.14 |
| 7,242,491 B2 * | 7/2007 | Nakayasu et al. | 358/1.15 |
| 8,145,265 B2 * | 3/2012 | Pawlecki et al. | 455/554.2 |
| 8,230,075 B1 * | 7/2012 | Weskamp | H04W 4/023 709/203 |
| 8,233,461 B1 * | 7/2012 | Debaty | H04L 41/12 370/338 |
| 8,502,996 B2 * | 8/2013 | St. Jacques, Jr. | G06F 3/1203 358/1.1 |
| 8,700,302 B2 * | 4/2014 | Khosravy et al. | 701/426 |
| 9,134,944 B1 * | 9/2015 | Platt | G06F 3/1204 |
| 2002/0161831 A1 * | 10/2002 | Nakaoka | G06F 3/1204 709/203 |
| 2003/0093675 A1 | 5/2003 | Hibino et al. | |
| 2004/0080625 A1 | 4/2004 | Kurosawa et al. | |
| 2004/0080779 A1 * | 4/2004 | Kawamoto | G06F 3/1204 358/1.14 |
| 2004/0125401 A1 * | 7/2004 | Earl et al. | 358/1.15 |
| 2004/0137855 A1 * | 7/2004 | Wiley | G06F 3/1204 455/88 |
| 2004/0236850 A1 * | 11/2004 | Krumm | H04L 29/06 709/224 |
| 2005/0071683 A1 * | 3/2005 | Mizuguchi | G06F 21/31 726/4 |
| 2005/0164633 A1 | 7/2005 | Linjama et al. | |
| 2006/0171357 A1 | 8/2006 | King et al. | |
| 2007/0009299 A1 * | 1/2007 | Matsunaga | G06F 3/1208 400/62 |
| 2007/0030341 A1 | 2/2007 | Morimoto | |
| 2007/0124436 A1 * | 5/2007 | Shepherd | G06F 3/1226 709/223 |
| 2007/0133843 A1 | 6/2007 | Nakatani | |
| 2007/0216938 A1 | 9/2007 | Tomita | |
| 2007/0234354 A1 | 10/2007 | Hattori | |
| 2007/0244963 A1 | 10/2007 | Hibino et al. | |
| 2007/0245014 A1 | 10/2007 | Hibino et al. | |
| 2008/0052710 A1 * | 2/2008 | Iwai | G06F 21/305 718/100 |
| 2008/0225326 A1 * | 9/2008 | Kephart | G06Q 30/0261 358/1.15 |
| 2008/0259399 A1 * | 10/2008 | Wada | G06F 3/1204 358/1.15 |
| 2009/0021776 A1 | 1/2009 | Dolan et al. | |
| 2009/0054077 A1 | 2/2009 | Gauthier et al. | |
| 2009/0116053 A1 * | 5/2009 | Selvaraj | G06F 3/1222 358/1.15 |
| 2009/0227268 A1 | 9/2009 | Sorensson et al. | |
| 2009/0264150 A1 * | 10/2009 | Andreasson | G01D 21/00 455/556.1 |
| 2010/0144376 A1 * | 6/2010 | Pawlecki | H04L 51/38 455/456.6 |
| 2010/0238491 A1 * | 9/2010 | Shiimori | G06F 3/1206 358/1.15 |
| 2010/0245886 A1 | 9/2010 | Okajima et al. | |
| 2011/0124350 A1 * | 5/2011 | Sukovic | H04W 4/02 455/456.3 |
| 2012/0002980 A1 * | 1/2012 | Tse | G03G 15/5075 399/8 |
| 2012/0019867 A1 * | 1/2012 | Prati | G06F 3/1204 358/1.15 |
| 2012/0075485 A1 | 3/2012 | Mizutani et al. | |
| 2012/0092715 A1 * | 4/2012 | Kamei | G06F 3/04886 358/1.15 |
| 2012/0290455 A1 * | 11/2012 | Mays | G06F 9/5072 705/34 |
| 2013/0050406 A1 | 2/2013 | Morimoto | |

FOREIGN PATENT DOCUMENTS

| | | |
|---|---|---|
| JP | 2002-244831 A | 8/2002 |
| JP | 2003-150354 A | 5/2003 |
| JP | 2004-228804 A | 8/2004 |
| JP | 2006-180378 A | 7/2006 |
| JP | 2006-215718 A | 8/2006 |
| JP | 2006-236176 A | 9/2006 |
| JP | 2007-043505 A | 2/2007 |
| JP | 2007067724 A | 3/2007 |
| JP | 2007-249461 A | 9/2007 |
| JP | 2008-293356 | 12/2008 |
| JP | 2009-303014 A | 12/2009 |
| JP | 2010-147527 A | 7/2010 |
| JP | 2010-154344 A | 7/2010 |
| JP | 2010-171664 A | 8/2010 |
| JP | 2012-150629 A | 8/2012 |
| WO | 2009/024882 A1 | 2/2009 |

OTHER PUBLICATIONS

U.S. Office Action dated Aug. 3, 2012, received in related U.S. Appl. No. 13/247,483.

United States Notice of Allowance dated May 29, 2014 from related U.S. Appl. No. 13/247,498.

Office Action dated Mar. 13, 2014 received in related U.S. Patent Application, namely U.S. Appl. No. 13/247,498.

U.S. Appl. No. 13/247,498, filed Sep. 28, 2011.

United States Office Action dated Aug. 15, 2013 received in related U.S. Appl. No. 13/247,498.

Japanese Official Action dated Apr. 28, 2015 received in related application JP 2011-093374 together with an English language translation.

Japanese Official Action dated Sep. 16, 2014 received in related application JP 2011-093374 together with an English language translation.

Japanese Official Action dated Nov. 18, 2014 received in related application JP 2011-206143 together with an English language translation.

Japanese Official Action dated Nov. 25, 2014 received in related application JP 2011-093376 together with an English language translation.

Japanese Official Action dated Dec. 2, 2014 received in related application JP 2011-206144 together with an English language translation.

(56) References Cited

OTHER PUBLICATIONS

Japanese Decision of Rejection issued to the corresponding Japanese Patent Application No. 2011-093376 dated Mar. 3, 2015 together with an English language translation.

* cited by examiner

| Selection Priority | MFP Name | IP Address | MFP Location Information | Relative Direction | Relative Distance | Flag |
|---|---|---|---|---|---|---|
| 1 | Third MFP | 192.168.0.3 | □□□ | D3 | R3 | — |
| 2 | Second MFP | 192.168.0.2 | △△△ | D2 | R2 | — |
| 3 | First MFP | 192.168.0.1 | ○○○ | D1 | R1 | — |

| Storage Priority | MFP Name | IP Address |
|---|---|---|
| 1 | Third MFP | 192.168.0.3 |
| 2 | — | — |

| Storage Priority | MFP Name | IP Address |
|---|---|---|
| 1 | First MFP | 192.168.0.1 |
| 2 | — | — |

| Selection Priority | MFP Name | IP Address | MFP Location Information | Relative Direction | Relative Distance | Flag |
|---|---|---|---|---|---|---|
| 1 | First MFP | 192.168.0.1 | ○○○ | D1 | R1 | Selection Candidate |
| 2 | Second MFP | 192.168.0.2 | △△△ | D2 | R2 | Selection Candidate |
| 3 | Third MFP | 192.168.0.3 | □□□ | D3 | R3 | — |

| Selection Priority | MFP Name | IP Address | MFP Location Information | Relative Direction | Relative Distance | Flag |
|---|---|---|---|---|---|---|
| 1 | Second MFP | 192.168.0.2 | △△△ | D2 | R2 | Selection Candidate |
| 2 | Third MFP | 192.168.0.3 | □□□ | D3 | R3 | — |
| 3 | First MFP | 192.168.0.1 | ○○○ | D1 | R1 | Selection Candidate |

# NON-TRANSITORY COMPUTER-READABLE RECORDING DEVICE STORING COMPUTER PROGRAM INCLUDING INSTRUCTIONS FOR CAUSING A DEVICE TO SELECT AN OBJECT DEVICE WITH WHICH THE DEVICE COMMUNICATES

CROSS-REFERENCE TO RELATED APPLICATIONS

This application claims priority to Japanese Patent Application No. 2010-218595, filed on Sep. 29, 2010 and Japanese Patent Application No. 2011-093376, filed on Apr. 19, 2011, the contents of which are hereby incorporated by reference into the present application.

TECHNICAL FIELD

The present application relates to a program of a mobile device, the mobile device, and a method for controlling the mobile device which enables a selection of an apparatus to engage in wireless communication by a simple procedure.

DESCRIPTION OF RELATED ART

A technique is known which connects a mobile device (a notebook personal computer, a mobile phone, or the like) and an apparatus (a printer or the like) by wireless communication (wireless LAN, Bluetooth, or the like). Radio waves in wireless communication have no directionality and are transmitted all around the mobile device. Therefore, a presence of a plurality of apparatuses around the mobile device means that there is a plurality of destination candidates of the wireless communication. A technique is known which, in this case, displays a list of identification information (an address, a name, or the like) of apparatuses capable of the wireless communication on a display unit of the mobile device to prompt a user to select a destination apparatus.

BRIEF SUMMARY

Conventionally, a technique is disclosed in which a mobile device and an image forming apparatus are provided with GPS (Global Positioning System) receivers and, based on coordinate data generated by the GPS, the mobile device transmits print data to a nearest image forming apparatus. However, with the conventional technique, the mobile device may inadvertently transmit the print data to an image forming apparatus located behind the user. Therefore, the conventional technique had not necessarily been convenient for the user. The present specification provides a technique capable of eliminating such inconveniences.

In another aspect of the teachings disclosed herein, a computer-readable recording device may be provided. The computer-readable recording device may store a computer program including instructions for causing a computer of a mobile device to operate as: a first storing controlling module that causes a storing unit to store one or more first information for identifying one or more candidate devices, the one or more first information being received from a wireless network by a communication unit configured to communicate using the wireless network; a sending controlling module that temporarily selects one candidate device as a temporarily selected candidate device from among the one or more candidate devices identified by the one or more first information, and controls the communication unit such that the communication unit sends a first instruction to the temporarily selected candidate device, the first instruction being an instruction that makes the temporarily selected candidate device perform a temporarily selected state notifying action for notifying that the temporarily selected candidate device has been selected; and a communication controlling module that controls the communication unit such that the communication unit communicates with the temporarily selected candidate device in a case where a predetermined condition is satisfied.

A method for controlling a mobile device and a mobile device are also novel and useful.

BRIEF DESCRIPTION OF DRAWINGS

FIG. 10 is a first diagram showing an example of stored contents of a usage table.

FIG. 11 is a first diagram showing an example of stored contents of an exclusion table.

FIG. 12 is a second diagram showing an example of the stored contents of a storage table.

FIG. 13 is a third diagram showing an example of the stored contents of the storage table.

DETAILED DESCRIPTION

Figure 1:
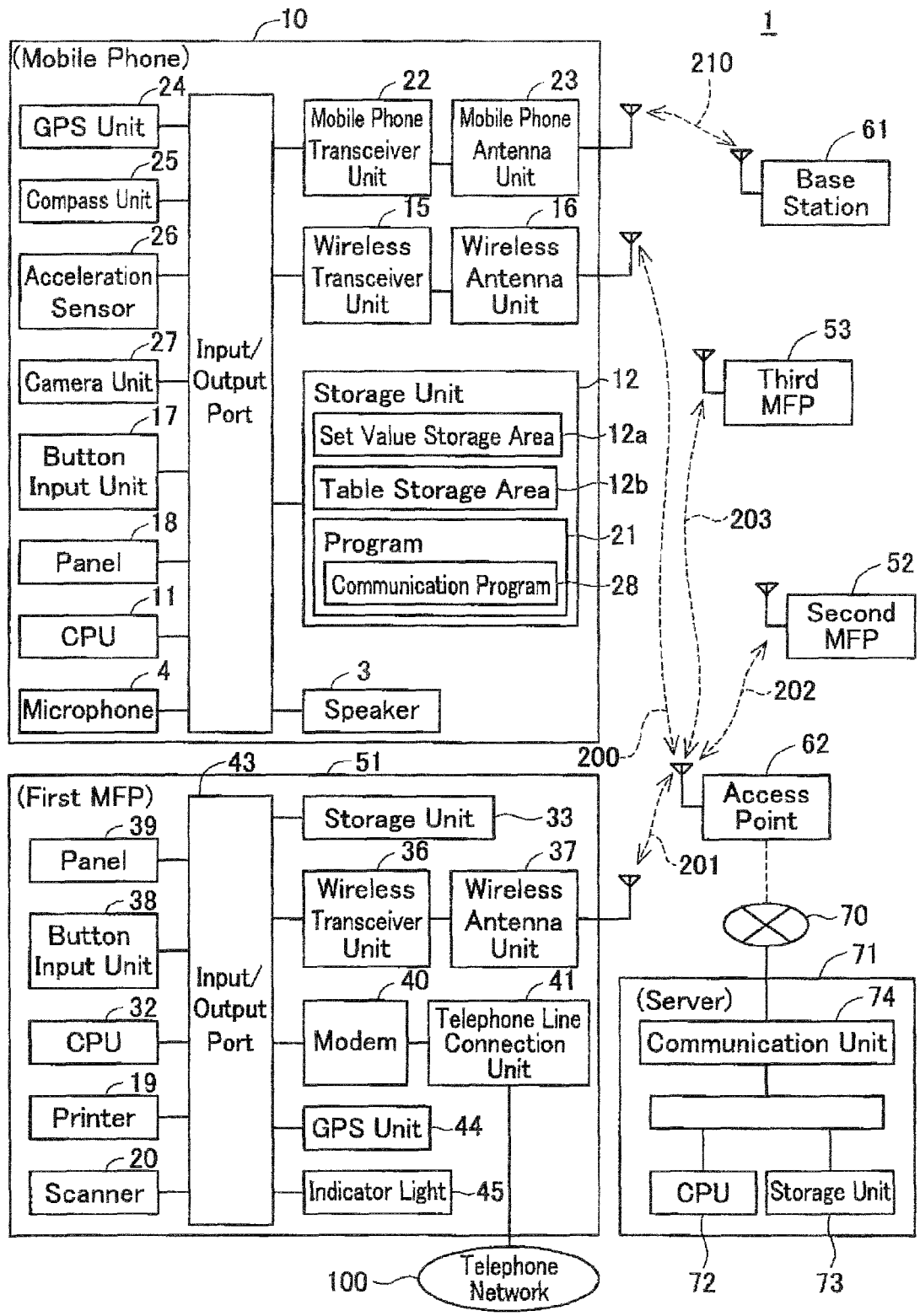
FIG. 1 is a block diagram of a communication system 1.

FIG. 1 shows a block diagram of a communication system 1 exemplified as a first embodiment of the present application. The communication system 1 comprises a mobile phone 10, first to third MFPs (Multifunction Peripheral) 51 to 53, an access point 62, a server 71, and a base station 61. The mobile phone 10 and the first to third MFPs 51 to 53 are each equipped with a function as a known wireless LAN terminal device. The first to third MFPs 51 to 53 are multifunction peripheral devices equipped with a printer function, a scanner function, a copier function, a facsimile function, and the like. The first to third MFPs 51 to 53 are equipped with a communication function which uses a telephone network 100. The access point 62 is equipped with a function as a known wireless LAN access point. The server 71 is connected to the access point 62 via the Internet 70.

Each of the first to third MFPs 51 to 53 and the access point 62 are configured to be capable of respectively performing wireless communications (data communications using radio waves) 201 to 203 conforming to a wireless LAN infrastructure mode (a mode in which a plurality of wireless LAN terminal devices performs data communication via an access point). Once the mobile phone 10 accesses the access point 62 and enters a state where wireless communication 200 conforming to a wireless LAN infrastructure mode can be performed, the mobile phone 10 can perform data communication with the first to third MFPs 51 to 53 and the server 71 via the access point 62. Examples of wireless LAN systems include a communication system specified by the IEEE802.11a/b/g/n standard.

A configuration of the mobile phone 10 will be described. As shown in FIG. 1, the mobile phone 10 mainly comprises a CPU (Central Processing Unit) 11, a storage unit 12, a wireless transceiver unit 15, a wireless antenna unit 16, a button input unit 17, a panel 18, a mobile phone transceiver unit 22, a mobile phone antenna unit 23, a GPS unit 24, a compass unit 25, an acceleration sensor 26, and a camera unit 27. A speaker 3 and a microphone 4 are provided for making calls and inputting sound.

Figure 7:
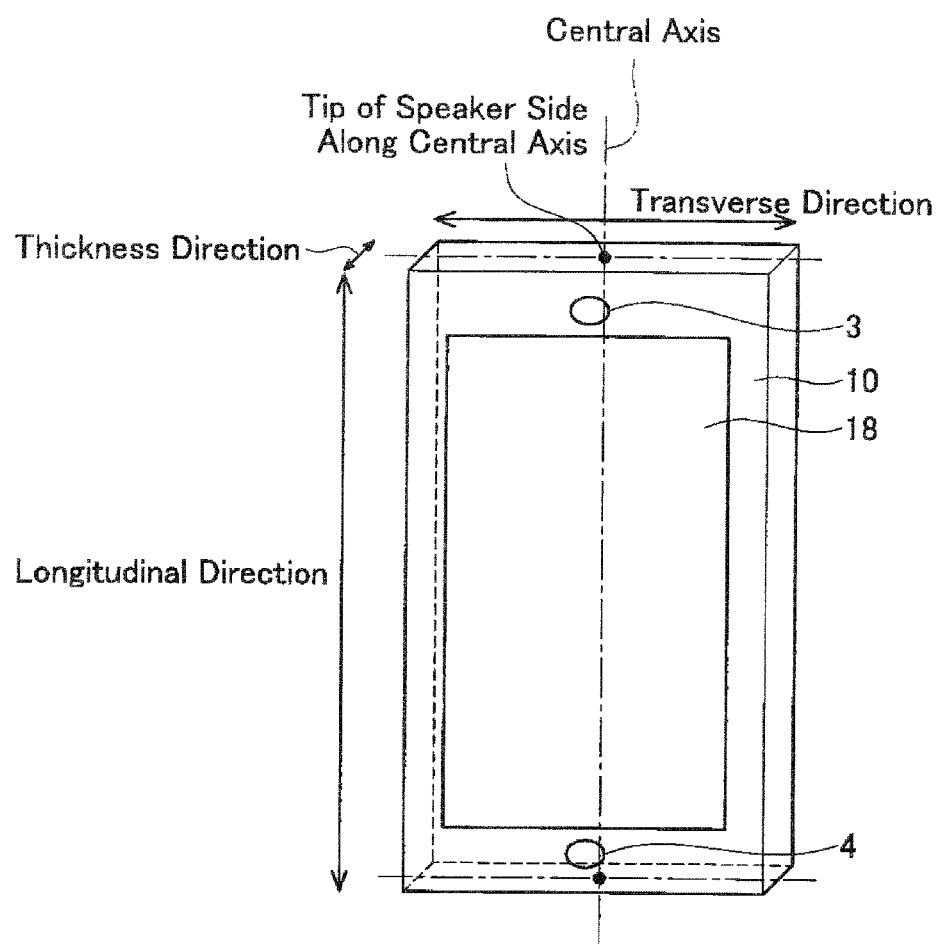
FIG. 7 is a schematic view of the mobile phone.

FIG. 7 shows a schematic view of the mobile phone 10. As shown in FIG. 7, an opening of the speaker 3 and an opening of the microphone 4 are arranged on an installation face of the panel 18 so that operations of the mobile phone 10 and calls using the mobile phone 10 may be easily performed. The opening of the speaker 3, the panel 18, and the opening of the microphone 4 are aligned in a longitudinal direction of the mobile phone 10 so that the opening of the speaker 3 and the opening of the microphone 4 are separated by a distance similar to a distance between the mouth and the ear of a user.

The CPU 11 executes processing according to programs stored in the storage unit 12. Subsequently, the CPU 11 that executes programs such as a communication program 28 or an operating system may sometimes be simply described by a program name. For example, the description "the communication program 28" may sometimes mean "the CPU 11 executing the communication program 28". The storage unit 12 is configured by combining a RAM (Random Access Memory), a ROM (Read Only Memory), a flash memory, an HDD (Hard Disk Drive), a buffer provided in the CPU 11, and the like. The wireless transceiver unit 15 performs wireless communication 200 conforming to a wireless LAN infrastructure mode via the wireless antenna unit 16. Digital signals constituting various data are transmitted and received by the wireless transceiver unit 15. The GPS unit 24 is a member which receives radio waves from a GPS satellite and which calculates location information indicating a physical location of the mobile phone 10. The term "physical location" herein may also be termed "absolute location". Location information includes latitude, longitude, and height components. The mobile phone transceiver unit 22 performs wireless communication 210 conforming to a mobile phone communication system with the base station 61 via the mobile phone antenna unit 23. The storage unit 12 stores a program 21. The program 21 includes a basic program (not shown), a communication program 28, and the like. The basic program includes a program for causing the mobile phone transceiver unit 22 to execute communication, a program for causing the wireless transceiver unit 15 to execute the wireless communication 200, and the like. The basic program is also a program which provides an API (Application Programming Interface) that enables respective programs to acquire information calculated by the GPS unit 24. The communication program 28 is a program which causes the CPU 11 to execute an operation flow of the communication system 1, which will be described later.

Figures 8, 9:
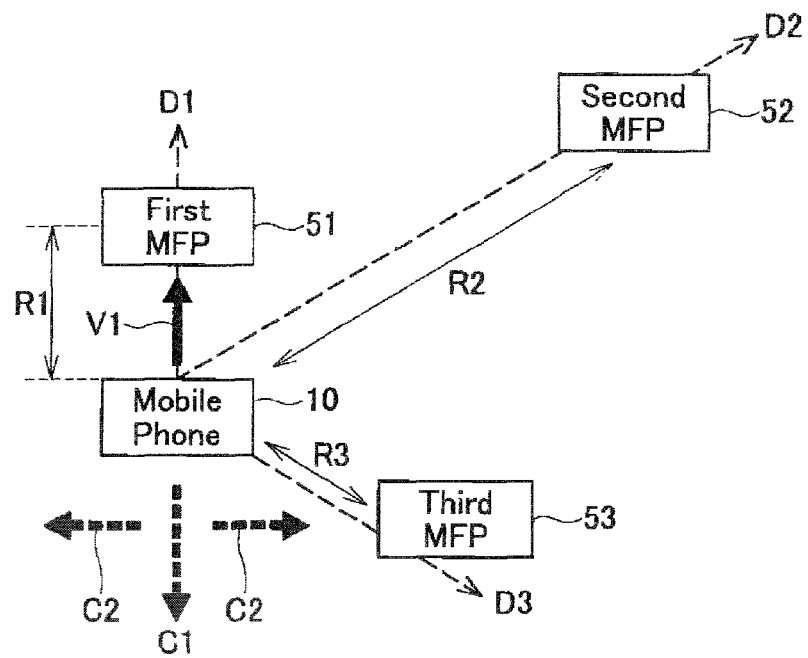
FIG. 8 is a diagram showing an example of an arrangement of MFPs.
FIG. 9 is a first diagram showing an example of stored contents of a storage table.

The storage unit 12 comprises a set value storage area 12a and a table storage area 12b. The set value storage area 12a stores a predetermined period of time, a predetermined acceleration value, an allowable angular range, a predetermined distance, a predetermined sequence and the like which will be described later. The table storage area 12b stores a storage table TB1. FIG. 9 shows an example of the storage table TB1. The storage table TB1 assigns a selection priority 220 to each of the first to third MFPs 51 to 53, and associatively stores MFP identification information 230, MFP location information 240, a relative direction 241, a relative distance 242, and a flag 243. The MFP identification information 230 is information that is unique to each of the first to third MFPs 51 to 53. The MFP identification information 230 is, for example, an IP address 232 of an MFP. An MFP name 231 is a name assigned to each of the first to third MFPs 51 to 53 by a user or administrator of the MFP or by a manufacturer prior to shipment. MFP location information 240 is information indicating a physical location of the first to third MFPs 51 to 53 and includes latitude, longitude, and height components. The mobile phone 10 receives information indicating a physical location from an MFP, and stores the information in the storage table TB1 without modification as the MFP location information 240 of the MFP. The relative direction 241 is information indicating directions in which the first to third MFPs 51 to 53 are located in relation to a location of the mobile phone 10 (directions with the mobile phone 10 as the reference). The relative direction 241 includes a horizontal component (a direction in which an MFP is located in relation to the mobile phone 10 when the mobile phone 10 and the location of the MFP relative to the mobile phone 10 are projected on a horizontal plane) and a vertical component (a direction in which the MFP is located in relation to the mobile phone 10 when the mobile phone 10 and the location of the MFP relative to the mobile phone 10 are projected on a vertical plane that is perpendicular to a vertical plane including the mobile phone 10 and the MFP). The relative distance 242 is a respective distance between the mobile phone 10 and the first to third MFPs 51 to 53. The relative distance 242 includes a horizontal component (a distance between the mobile phone 10 and an MFP when the mobile phone 10 and the location of the MFP relative to the mobile phone 10 are projected on a horizontal plane) and a vertical component (a distance between the mobile phone 10 and the MFP when the mobile phone 10 and the location of the MFP relative to the mobile phone 10 are projected on a vertical plane that is perpendicular to a vertical plane including the mobile phone 10 and the MFP). The flag 243 is flag information indicating a selection candidate.

The table storage area 12b stores an exclusion table TB2 and a usage table TB3. FIG. 10 shows an example of the usage table TB3. The usage table TB3 is for storing MFPs for which selection priority 220 is to be raised. The usage table TB3 stores a storage priority 221 and MFP identification information 230. The storage priority 221 is information indicating a sequence of storage in the usage table TB3. The smaller the storage priority 221 of MFP identification information 230, the more recently the MFP identification information 230 had been stored in the usage table TB3. While the usage table TB3 in FIG. 10 is depicted to include storage priorities 221 up to "2", such a mode is not restrictive.

Instead, the usage table TB3 may be arranged so that a greater number of storage priorities 221 are storable therein.

FIG. 11 shows an example of the exclusion table TB2. The exclusion table TB2 is a table for storing MFPs of which selection priorities 220 are to be lowered. Since the exclusion table TB2 is otherwise configured in a similar manner to the usage table TB3, a detailed description will be omitted.

The button input unit 17, the GPS unit 24, the compass unit 25, the acceleration sensor 26, and the camera unit 27 are operation units that receive an operation by a user of the mobile phone 10. The button input unit 17 is integrally configured with the panel 18 as a touch panel. The panel 18 displays various types of function information of the mobile phone 10. The compass unit 25 includes a geomagnetic sensor that acquires an orientation of the mobile phone 10. The acceleration sensor 26 is a sensor that measures an acceleration of the mobile phone 10. The camera unit 27 is a portion that acquires image data with a CCD or the like. The basic program provides an API (Application Programming Interface) that enables the respective programs to acquire information indicating an orientation acquired by the compass unit 25, an acceleration measured by the acceleration sensor 26, image data acquired by the camera unit 27, and the like.

A configuration of the first MFP 51 will be described. The first MFP 51 mainly comprises a CPU 32, a storage unit 33, a wireless transceiver unit 36, a wireless antenna unit 37, a button input unit 38, a panel 39, a modem 40, a telephone line connection unit 41, a printer 19, a scanner 20, a GPS unit 44, and an indicator light 45. These components are configured to be mutually communicable via an input/output port 43.

The CPU 32 controls respective functions according to programs stored in the storage unit 33, various signals transmitted and received via the wireless transceiver unit 36, and the like. The storage unit 33 may be configured by combining a RAM (Random Access Memory), a ROM (Read Only Memory), a flash memory, an HDD (Hard Disk Drive), or the like.

The wireless transceiver unit 36 performs wireless communication 201 conforming to a wireless LAN infrastructure mode via the wireless antenna unit 37. Digital signals constituting various data are transmitted and received by the wireless transceiver unit 36.

The button input unit 38 is one or more keys for executing various functions of the first MFP 51. The button input unit 38 may be integrally configured with the panel 39 as a touch panel. The panel 39 displays various function information of the first MFP 51. The printer 19 is a portion that executes printing. The scanner 20 is a portion that executes scanning. The GPS unit 44 is a portion that acquires location information of the first MFP 51. The indicator light 45 comprises an LED (Light Emitting Diode) or the like and is a portion that notifies various statuses of the first MFP 51 to the user. The modem 40 modulates document data to be transmitted using the facsimile function into a signal transmittable to the telephone network 100 and transmits the signal via the telephone line connection unit 41, and receives an inputted signal from the telephone network 100 via the telephone line connection unit 41 and demodulates the signal into document data. Since configurations of the second MFP 52 and the third MFP 53 are the same as the first MFP 51, a detailed description will be hereby omitted.

A configuration of the server 71 will be described. The server 71 mainly comprises a CPU 72, a storage unit 73, and a communication unit 74. The server 71 is a device that provides its own functions or data to a client device in a network. The CPU 72 controls various functions. The storage unit 73 stores various data. The communication unit 74 communicates various types of information with the mobile phone 10.

Figure 19:
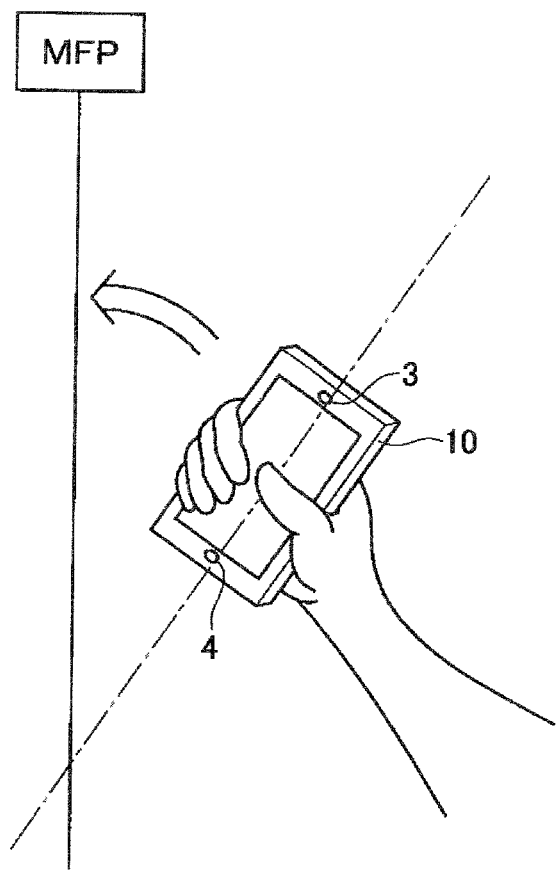
FIG. 19 is a schematic view of a usage example of the mobile phone.

Operations of the communication system 1 according to a first embodiment will be described with reference to FIGS. 2 to 13. A flow performed by the mobile phone 10 will be described with reference to FIGS. 2 to 5. The flows shown in FIGS. 2 to 5 are executed in response to an activation of the communication program 28 of the mobile phone 10. As shown in FIG. 19, in the first embodiment, the user grips a side of the microphone of the mobile phone 10 and holds the mobile phone so that the panel 18 faces upward, and when the user briskly waves the mobile phone 10 toward an MFP that the user wishes to set as a data communication object (so that a tip of a side of the speaker 3 of the mobile phone 10 points toward the MFP), the mobile phone 10 performs data communication with the MFP existing in a direction pointed by its speaker 3 side tip as the data communication object.

Figure 2:
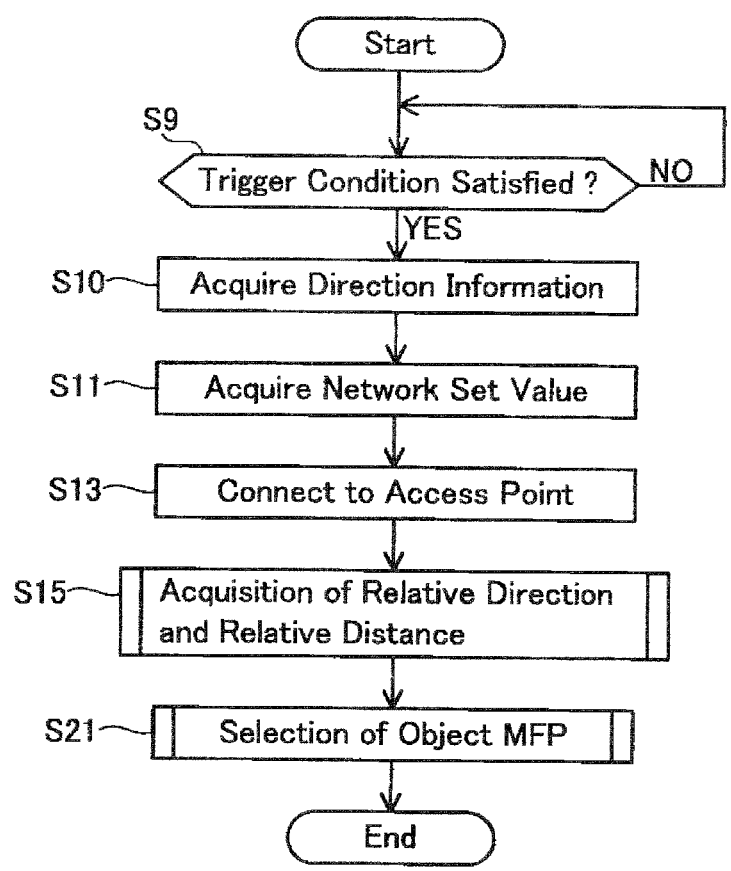
FIG. 2 is a diagram showing a first operation flow chart of a mobile phone.

In S9 in FIG. 2, the CPU 11 first determines whether or not an acceleration measured by the acceleration sensor 26 has been abruptly switched from an acceleration, which is equal to or greater than a predetermined value and oriented in one direction, to an acceleration which has an equal or grater than predetermined value and is oriented in an opposite direction; in other words, whether or not an operation conducted by the user is an operation that satisfies a trigger condition. In particular, the CPU 11 makes a determination using acceleration acquired regularly using an API. When the trigger condition is not satisfied (S9: NO), the CPU 11 returns to S9. On the other hand, when the trigger condition is satisfied (S9: YES), the CPU 11 advances to S10. Providing the determination of the trigger condition means that processes of S10 and thereafter are not executed unless the user performs the operation in which the mobile phone 10 is briskly waved and then held still. Therefore, a situation can be prevented where data communication is executed by mistake due to the user moving the mobile phone 10 without an intention of performing data communication. In S10, the CPU 11 uses the API to acquire information indicating an orientation of the mobile phone 10 from the compass unit 25. Using the acquired information, the CPU 11 calculates a direction in which the speaker 3 side tip is located in relation to the microphone side tip along a central axis in a longitudinal direction (an axis which is located at a center in a transverse direction and a center in a thickness direction and which extends in a longitudinal direction: refer to FIG. 7) of the mobile phone 10 in relation to a reference location of the mobile phone 10 (a center in the longitudinal direction, a center in the transverse direction, and a center in a thickness direction of the mobile phone 10: refer to FIG. 7). In other words, information is calculated which indicates what direction is specified by an operation received from the user by the mobile phone 10 in relation to the location of the mobile phone. The calculated information is stored in the storage unit 12 as a direction information. The direction information includes a horizontal component (a direction in which the tip of the mobile phone 10 on the speaker 3 side is located in relation to a reference location of the compass unit 25 when relative locations of the reference location of the compass unit 25 and a location of the speaker 3 side tip of the mobile phone 10 are projected on a horizontal plane).

Subsequently, in S11, the CPU 11 acquires a network set value. Specifically, a wireless LAN probe request is broadcasted using the wireless transceiver unit 15. An SSID (Service Set Identifier) included in a probe response returned by an access point (e.g., the access point 62) in a radio wave range of the wireless transceiver unit 15 is then received and temporarily stored in a work area (a RAM of the storage unit 12 or a buffer) of the CPU 11. In S13, the CPU 11 accesses the access point 62 using the acquired SSID and enters a state where wireless communication 200 conforming to the wireless LAN infrastructure mode can be performed.

In S15, the CPU 11 executes a flow for acquiring a relative direction and a relative distance. Detailed contents of the flow for acquiring the relative direction and the relative distance will be described with reference to FIG. 3. In S111, the CPU 11 uses the wireless transceiver unit 15 to broadcast first data (the first data includes a broadcast address as information indicating a destination of the first data in order to indicate that the first data is being broadcasted) by wireless communication 200 conforming to the wireless LAN infrastructure mode. As a result, wireless clients accessing the access point 62 (in other words, the wireless clients including the first to third MFPs 51 to 53) receive the first data via the access point. The first data includes identification information (IP address) of the mobile phone 10 in order to indicate a source of the first data. The first data also includes inquiry information (which is also information indicating that the data is first data; as a specific example, an SNMP (Simple Network Management Protocol) Request command) for inquiring whether the communication program 28 is supported.

In S113, the CPU 11 determines whether or not second data has been returned from the first to third MFPs 51 to 53. Specifically, the CPU 11 determines whether or not data has been received which includes the identification information of the mobile phone 10 in order to indicate the destination, the identification information (IP address) of an MFP in order to indicate the source, and reply information (which is also information indicating that the data is second data; as a specific example, an SNMP Reply command) for notifying the mobile phone that the data is a reply to the first data. When the second data is received (S113: YES), the CPU 11 advances to S115. In S115, the CPU 11 extracts MFP identification information from the second data. Since the second data also includes information indicating a physical location of an MFP, the CPU 11 also extracts information indicating a physical location of the MFP from the second data. The extracted identification information and information indicating the physical location are temporarily stored in the storage table TB1 as an IP address 232 and MFP location information 240 of the MFP.

When the second data has not been received (S113: NO), the CPU 11 advances to S117 to determine whether or not a reply wait time for the second data has elapsed. When the reply wait time has not elapsed (S117: NO), the CPU 11 returns to S113, and when it had elapsed (S117: YES), the CPU 11 advances to S121. In S121, the CPU 11 acquires location information of the mobile phone 10 calculated by the GPS unit 24. The acquired location information of the mobile phone 10 is temporarily stored in the storage unit 12.

In S125, the CPU 11 calculates a relative direction and a relative distance. The calculation of the relative direction and the relative distance is performed based on the location information of the mobile phone 10 and the MFP location information 240 stored in the storage unit 12. The calculated relative direction and relative distance are temporarily stored in the storage table TB1 as the relative direction 241 and the relative distance 242 of the MFP.

In S127, the CPU 11 determines whether or not the relative direction 241 and the relative distance 242 have been calculated for all MFPs which have returned the second data. If calculated (S127: YES), the CPU 11 ends the flow, and the CPU 11 advances to S21 (FIG. 2), and if not calculated (S127: NO), the CPU 11 advances to S129. In S129, the CPU 11 selects an uncalculated MFP and then returns to S125. Accordingly, the relative direction 241 and the relative distance 242 can be acquired for all MFPs which have returned the second data.

In S21, the CPU 11 selects an object MFP based on the direction information, the location information of the mobile phone 10, and the location information of MFP respectively stored in the storage unit 12. An object MFP is an MFP to become an object of data communication (in other words, an MFP that is to execute the data communication with the mobile phone 10). A flow for selecting the object MFP will be described with reference to FIG. 4. In S301, the CPU 11 sorts the selection priorities 220 of MFPs stored in the storage table TB1 so that the selection priority 220 of an MFP with a small difference between the direction indicated by the horizontal component of the relative direction 241 and the direction indicated by the horizontal component of the direction information is given a higher priority than the selection priority 220 of an MFP with a large difference between the direction indicated by the horizontal component of the relative direction 241 and the direction indicated by the horizontal component of the direction information.

In S303, the CPU 11 determines the number of MFPs (MFPs existing in front of the user of the mobile phone 10) of which a difference between a direction indicated by a horizontal component of the relative direction 241 and a direction indicated by a horizontal component of the direction information is less than 90 degrees (in other words, in a direction pointed by the speaker 3 side tip of the mobile phone 10 or in front as seen from the user of the mobile phone 10). When there is a plurality of MFPs existing in front of the user (S303: plurality), the CPU 11 advances to S304. When no MFP exists in front of the user (S303: zero), the CPU 11 advances to S314. When there is only one MFP existing in front of the user (S303: one), the CPU 11 advances to S306. In S306, the CPU 11 selects the MFP to be a temporarily selected MFP and advances to S317. In S304, the CPU 11 sets the MFPs existing in front of the user as selection candidates. For example, when the user of the mobile phone 10 is on a first floor, it is inconvenient to set an MFP installed on a second floor as the data communication object. Therefore, only MFPs of which the distance indicated by the vertical component of the relative distance 242 is within a threshold value (for example, less than 2 meters) are set as the selection candidates of the temporarily selected MFP among the MFPs of which the difference between the direction indicated by the horizontal component of the relative direction 241 and the direction indicated by the horizontal component of the direction information is less than 90 degrees. Setting as the selection candidate means to store information of the MFP, that is set as the selection candidate, in the storage table TB1 in association with the flag 243 (FIG. 9) indicating that the MFP is the selection candidate of the temporarily selected MFP. In S314, the CPU 11 sorts selection priorities 220 of MFPs stored in the storage table TB1 so that the selection priority 220 of the MFP with a shorter distance indicated by the horizontal component of the relative distance 242 is given a higher priority than the selection priority 220 of the MFP with a longer distance indicated by the horizontal component of the relative distance 242.

In S315, the CPU 11 sorts the selection priorities 220 of the MFPs stored in the storage table TB1 so that, among the selection candidate MFPs, the selection priorities 220 of the MFPs stored in the exclusion table TB2 are given lower priority and the selection priorities 220 of the MFPs stored in the usage table TB3 are given higher priority. Specifically, a determination is made on whether an MFP is stored in the exclusion table TB2 (or whether the MFP is not stored in the usage table TB3). Subsequently, processing is performed in which, if the MFP is stored in the exclusion table TB2 (or if the MFP is not stored in the usage table TB3), the selection priority of the MFP is set one rank lower than the MFP with the lowest selection priority among the MFPs not stored in the exclusion table TB2 (or among the MFPs stored in the usage table TB3). The processing is repetitively performed until the selection priorities of all of the MFPs stored in the exclusion table TB2 (or all MFPs not stored in the usage table TB3) become lower than the selection priorities of the MFPs not stored in the exclusion table TB2 (or the MFPs stored in the usage table TB3).

In S316, the CPU 11 selects the MFP of which the selection priority 220 has been set to "1", which is the topmost selection priority among the storage table TB1, and for which the flag 243 indicating that the MFP is a selection candidate, as a temporarily selected MFP. The temporarily selected MFP is an MFP temporarily set to a selected state as the candidate for performing data communication. Accordingly, the temporarily selected MFP can be automatically decided without needing user input.

In S317, the CPU 11 causes the wireless transceiver unit 15 to transmit a notification executing instruction to the temporarily selected MFP. The notification executing instruction is an instruction for causing the temporarily selected MFP to perform a temporarily selected state notifying action for notifying that it has been temporality selected as the temporarily selected candidate device. The temporarily selected MFP having received the instruction performs the temporarily selected state notifying action. Examples of the temporarily selected state notifying action include methods such as lighting the indicator light 45, causing the panel 39 to display a notification of the temporal selection, moving movable parts of the printer 19 or the scanner 20, and moving other movable parts of the MFP.

In S318, the CPU 11 determines whether or not a canceling action of the temporal selection has been executed. The canceling action is an action for canceling the temporal selection of the temporarily selected MFP. The canceling action is executed after the direction information is stored in the storage unit 12 in S17 and in response to an input of cancellation information to an external input receiving module. The cancellation information is direction information indicating a different direction from the direction information acquired in S10.

The cancellation information may be various types of direction information. For example, the cancellation information may be direction information having an opposite direction from the direction indicated by the direction information V1 as is the case of cancellation information C1 shown in FIG. 8. Accordingly, for example, when a temporal selection is made by holding out the mobile phone 10 in the direction indicated by the direction information V1, the temporal selection can be cancelled by an action in which the mobile phone 10 is moved in the direction indicated by the cancellation information C1 (in other words, an action by which the mobile phone 10 that had been held out is restored to its original location).

As another alternative example, the cancellation information may have a direction perpendicular to the direction indicated by the direction information V1 as is the case of cancellation information C2 shown in FIG. 8. Accordingly, for example, when the temporal selection is made by holding out the mobile phone 10 in the direction indicated by the direction information V1, the temporal selection can be cancelled by an action in which the mobile phone 10 is moved in the direction indicated by the cancellation information C2 (in other words, an action by which the mobile phone 10 is waved sideways).

When the canceling action is executed (S318: YES), the CPU 11 advances to S319. In S319, the CPU 11 causes the cancellation information to be stored in the storage unit 12. In S321, the CPU 11 uses the wireless transceiver unit 15 to transmit a notification terminating instruction to the temporarily selected MFP. The notification terminating instruction is an instruction issued to the temporarily selected MFP which causes the temporarily selected state notifying action to be terminated. The flow is then finished. The temporarily selected MFP having received the instruction terminates the temporarily selected state notifying action.

Figure 5:
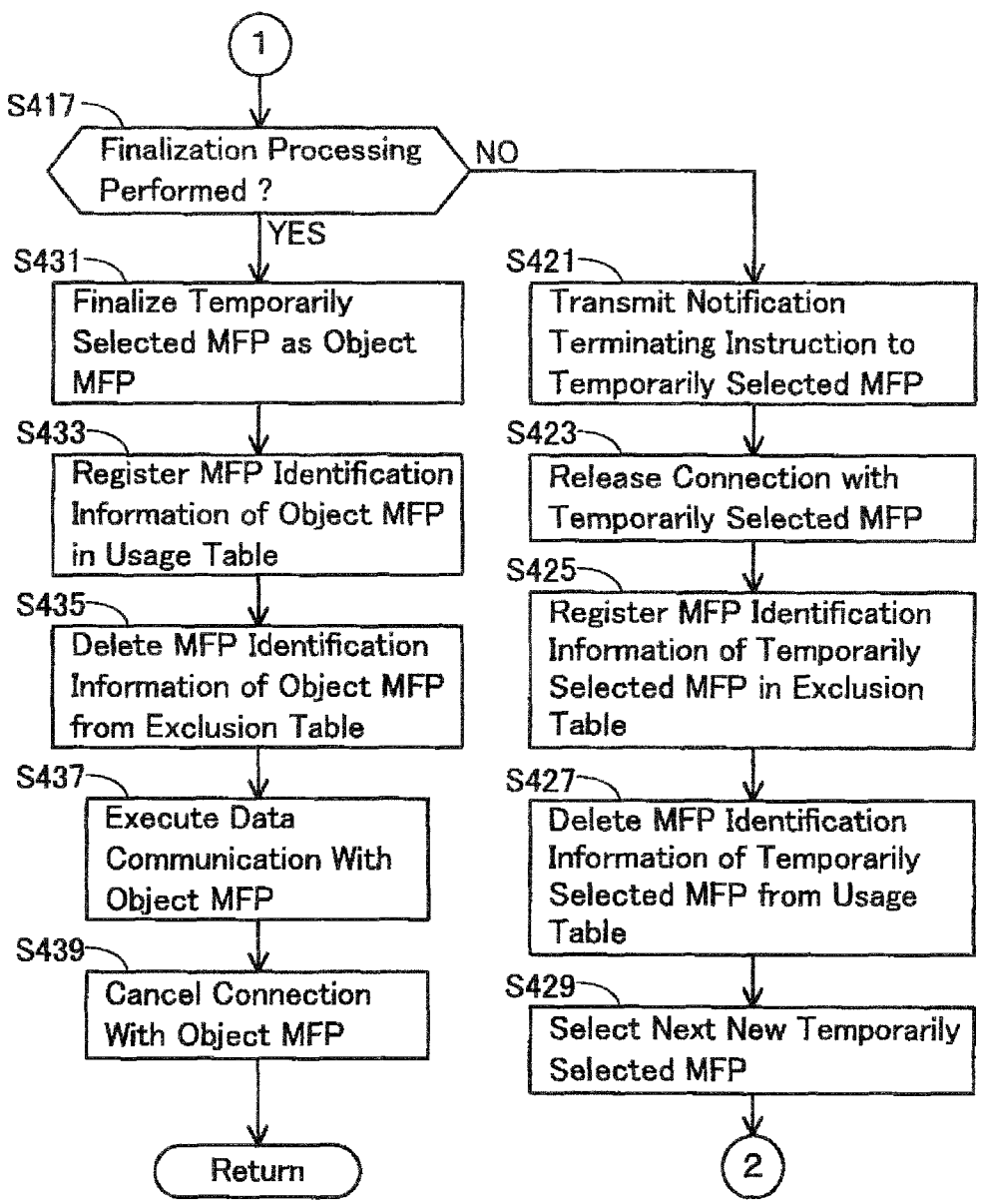
FIG. 5 is a diagram showing a fourth operation flow chart of the mobile phone.

On the other hand, when the canceling action is not executed in S318 (S318: NO), the CPU 11 advances to S417 (FIG. 5). In S417, the CPU 11 determines whether or not finalization processing has been performed. Finalization processing is processing for receiving input information input by an operation by the user, who desired to finalize the temporarily selected MFP as the object MFP, to instruct to finalize the object MFP. An example of finalization processing is processing in which the external input receiving module receives a predetermined external input. Examples of the predetermined external input include an OK button provided at the button input unit 17 being pressed and acceleration being applied to the acceleration sensor 26 by waving the mobile phone 10.

Other examples of finalization processing include processing in which a lapse of a given period of time is detected without the external input receiving module receiving a predetermined external input. In this case, an example of the predetermined external input is an NG operation performed to cancel an execution of communication processing. An example of the NG operation is a cancel button of the button input unit 17 being pressed. The given period of time may be determined in advance by the user and stored in the set value storage area 12*a*.

When the finalization processing is executed (S417: YES), the CPU 11 advances to S431. In S431, the CPU 11 finalizes the temporarily selected MFP as the object MFP. In S433, the CPU 11 stores the MFP identification information 230 of the object MFP in the usage table TB3. Specifically, in the usage table TB3, storage priorities 221 of MFP identification information 230 already stored are respectively lowered by one rank. At this point, the MFP identification information 230 having the greatest storage priority 221 is deleted. The MFP identification information 230 of the object MFP is stored in the storage priority 221="1" field. In S435, the CPU 11 deletes the MFP identification information 230 of the object MFP from the exclusion table TB2.

In S437, the CPU 11 executes data communication with the object MFP. Specifically, the CPU 11 executes data communication in which the CPU 11 reads out MFP identification information 230 (IP address) of the object MFP from the storage table TB1, causes the wireless transceiver unit 15 to transmit data including the IP address of the object MFP to be indicated as the destination as transmission data to the object MFP, and causes the wireless transceiver unit 15 to receive data including the IP address of the object MFP (in other words, data transmitted by the object MFP) as reception data. The IP address of the object MFP is information for identifying a sender of the data. Various types of data are conceivable as the data handled in data communication. For example, processing data may be transmitted to the object MFP by the wireless transceiver unit 15 to have the object MFP execute predetermined processing thereon. Specifically, print data may be transmitted to the object MFP by the wireless transceiver unit 15 to have the object MFP perform printing of the print data using the printer 19. A scanning instruction may be transmitted to the object MFP by the wireless transceiver unit 15 to have the wireless transceiver unit 15 receive scan data generated by the object MFP using the scanner 20 from the object MFP. An IP phone instruction may be transmitted to the object MFP by the wireless transceiver unit 15 to have the object MFP execute a call or a facsimile communication to a phone device or a facsimile device existing on another end of the telephone line via the modem 40 of the object MFP and the telephone line connection unit 41. In S439, the CPU 11 releases the connection with the object MFP. The flow is then finished.

On the other hand, when the finalization processing is not executed in S417 (S417: NO), the CPU 11 advances to S421. In S421, the CPU 11 causes the wireless transceiver unit 15 to transmit a notification terminating instruction to the temporarily selected MFP. In S423, the CPU 11 releases the connection with the temporarily selected MFP. In S425, the CPU 11 stores the MFP identification information 230 of the temporarily selected MFP in the exclusion table TB2. Since the registration processing to the exclusion table TB2 is similar to the registration processing (S433) to the usage table TB3 described earlier, a detailed description will be hereby omitted.

Figure 4:
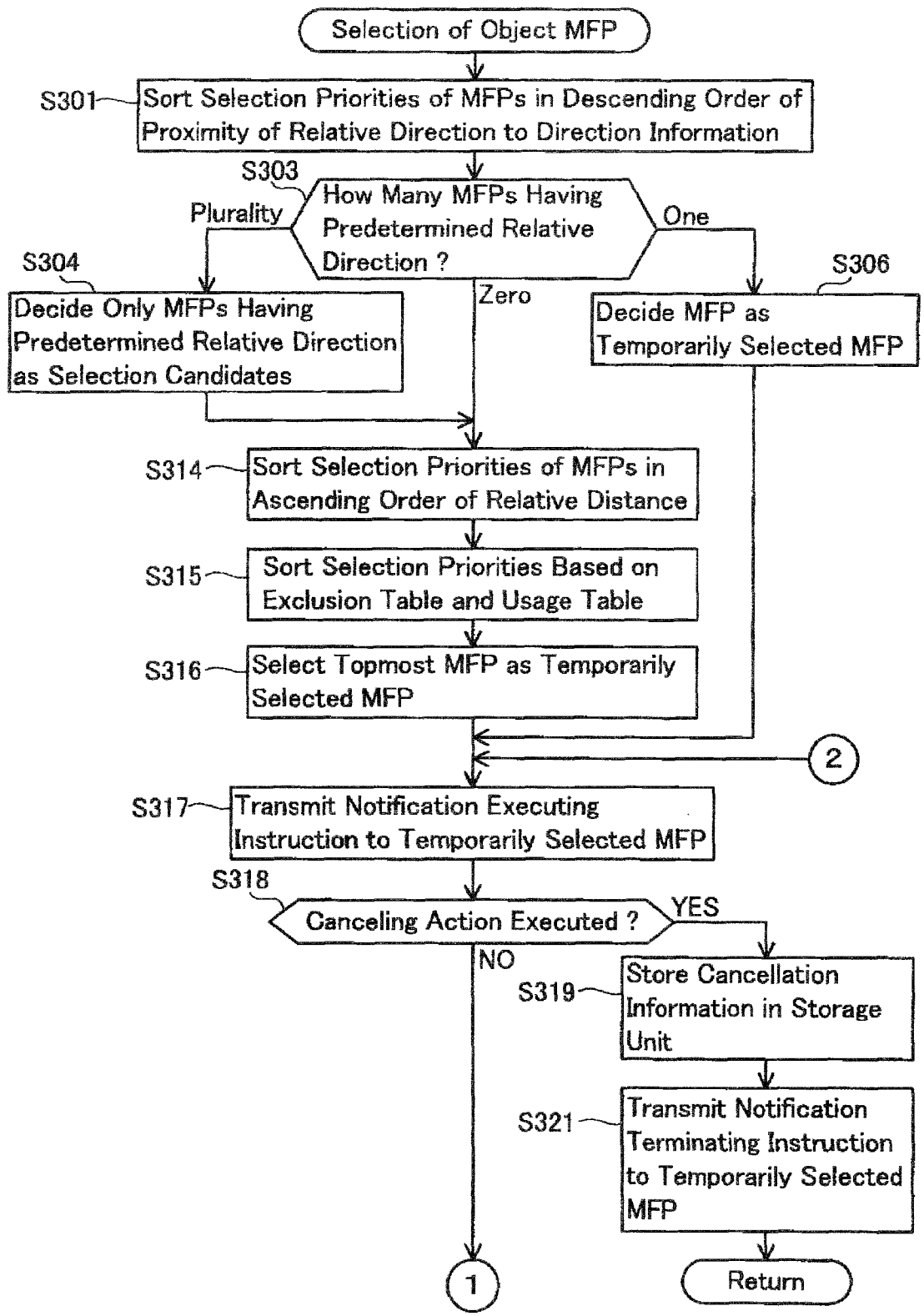
FIG. 4 is a diagram showing a third operation flow chart of the mobile phone.

In S427, the CPU 11 deletes the MFP identification information 230 of the temporarily selected MFP from the usage table TB3. In S429, the CPU 11 selects a next new temporarily selected MFP. As the next new temporarily selected MFP, an MFP is selected which has a lower priority than the selection priority 220 of the current temporarily selected MFP and for which is stored the flag 243 indicating that the MFP is a selection candidate in the storage table TB1. The CPU 32 then returns to S317 (FIG. 4).

Figure 6:
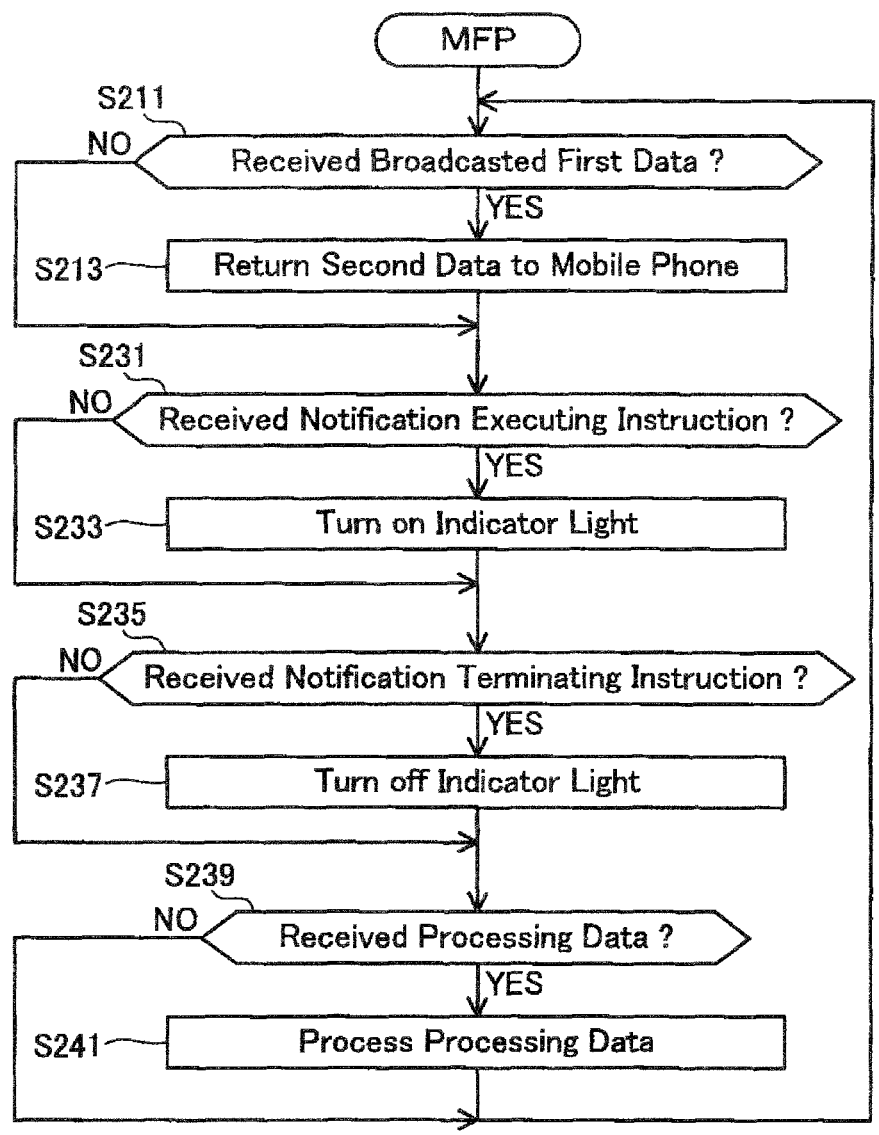
FIG. 6 is a diagram showing an operation flow chart of an MFP.

Flows performed at the first to third MFPs 51 to 53 will be described with reference to FIG. 6. In S211, the CPU 32 determines whether or not first data broadcasted from the mobile phone 10 has been received (specifically, the CPU 32 determines whether or not data has been received which includes a broadcast address as information indicating a destination and which includes information indicating that the data is first data). When not received (S211: NO), the CPU 32 advances to S219, and when received (S211: YES), the CPU 32 advances to S213. In S213, the CPU 32 returns the second data to the mobile phone 10.

In S231, the CPU 32 determines whether or not a notification executing instruction has been received from the mobile phone 10. When not received (S231: NO), the CPU 32 advances to S235, and when received (S231: YES), the CPU 32 advances to S233. In S233, the CPU 32 causes the indicator light 45 to be turned on. Accordingly, the user can be notified that the user's own device (the device that received the notification executing instruction) has been temporarily selected.

In S235, the CPU 32 determines whether or not a notification terminating instruction has been received. When not received (S235: NO), the CPU 32 advances to S239, and when received (S235: YES), the CPU 32 advances to S237. In S237, the CPU 32 causes the indicator light 45 to be turned off. Accordingly, the user can be notified that the temporal selection of the user's own device had been cancelled.

In S239, the CPU 32 determines whether or not processing data such as print data has been received from the mobile phone 10. When not received (S239: NO), the CPU 32 returns to S211, and when received (S239: YES), the CPU 32 advances to S241. In S241, the CPU 32 executes processing on the processing data. For example, when the processing data is print data, processing is executed for printing the print data using the printer 19. The CPU 32 then returns to S211.

As a specific example of operations of the communication system 1 according to the first embodiment, a case will be described in which first to third MFPs 51 to 53 are arranged in a form shown in FIG. 8. A case will be described in which the first MFP 51 is selected as an object MFP. A case will be described in which the first MFP 51 is stored in the exclusion table TB2 (FIG. 11) and the third MFP 53 is stored in the usage table TB3 (FIG. 10). A case will be described in which the acceleration sensor 26 is used as an operation unit which receives an operation by the user. A case will be described in which the CPU 11 causes the wireless transceiver unit 15 to transmit print data to the object MFP.

The flow shown in FIG. 2 is started in response to an activation of the communication program 28 by an operation of the button input unit 17 of the mobile phone 10 by the user. A trigger condition is satisfied in correspondence to the mobile phone 10 being briskly waved toward the first MFP 51 and then held still by the user who wishes to set the first MFP 51 as the data communication object (S9: YES). Subsequently, the mobile phone 10 acquires direction information (S10). In this case, the direction indicated by the direction information is a direction from the mobile phone 10 toward the first MFP 51. The mobile phone 10 then accesses the access point 62 and enters a state where wireless communication 200 conforming to the wireless LAN infrastructure mode can be performed (S13). Next, the mobile phone 10 broadcasts first data to the first to third MFPs 51 to 53 (S111). Subsequently, the first to third MFPs 51 to 53 receive the first data (S211: YES) and return second data to the mobile phone 10 (S213). The mobile phone 10 receives the second data from the first to third MFPs 51 to 53 (S113: YES) and stores the second data in the storage table TB1 of the storage unit 12 (S115). Therefore, as shown in FIG. 9, the MFP identification information 230 and the MFP location information 240 are associated to each of the first to third MFPs 51 to 53 and stored in the storage table TB1. At this point, the selection priorities 220 are arranged in a sequence of storage of the selection priorities 220 in the storage table TB1.

The mobile phone 10 acquires location information of the mobile phone calculated by the GPS unit 24 (S121). The mobile phone 10 calculates the relative direction and the relative distance for each of the first to third MFPs 51 to 53 (S125). As a result, as shown in FIG. 8, a relative direction D1 of the first MFP 51, a relative direction D2 of the second MFP 52, and a relative direction D3 of the third MFP 53 are calculated. A relative distance R1 of the first MFP 51, a relative distance R2 of the second MFP 52, and a relative distance R3 of the third MFP 53 are respectively calculated. Subsequently, as shown in FIG. 9, the calculated relative directions and relative distances are stored in the storage table TB1 as the relative direction 241 and the relative distance 242.

Once the relative direction and the relative distance have been calculated for all of the first to third MFPs 51 to 53

(S127: YES), the mobile phone 10 sorts the selection priorities 220 of the MFPs stored in the storage table TB1 in an ascending order of the difference between the direction indicated by the horizontal component of the relative direction 241 and the direction indicated by the horizontal component of direction information V1 (S301). In the example shown in FIG. 8, since the direction indicated by the horizontal component of the direction information V1 and the direction indicated by the horizontal component of the relative direction 241 (=D1) are consistent with each other, the selection priority 220 of the first MFP 51 is set to "1" which is the highest priority. Since the direction indicated by the horizontal component of the direction information V1 and the direction indicated by the horizontal component of the relative direction 241 (=D3) significantly differ from each other, the selection priority 220 of the third MFP 53 is set to "3" which is the lowest priority. Since there is a plurality of MFPs (the first MFP 51 and the second MFP 52) whose difference between the direction indicated by the horizontal component of the direction information V1 and the direction indicated by the horizontal component of the relative direction 241 are less than 90 degrees (S303: YES), only the first MFP 51 and the second MFP 52 are set as the selection candidates (S304), and the flag 243 indicating that the MFP is a selection candidate is stored in the storage table TB1 (FIG. 12). Subsequently, the selection priorities 220 are sorted in an ascending order of a distance indicated by a horizontal component of the relative distance 242 (S315). In the example shown in FIG. 8, since a distance indicated by a horizontal component of the relative distance 242 (=R1) is shorter than a distance indicated by a horizontal component of the relative distance 242 (=R2), the selection priority 220 of the first MFP 51 is set to "1" and the selection priority 220 of the second MFP 52 is set to "2". Accordingly, the sorting is completed as shown in the storage table TB1 of FIG. 12.

The mobile phone 10 sorts the MFPs stored in the storage table TB1 so that the selection priority 220 of the first MFP 51 stored in the exclusion table TB2 (FIG. 11) is given a low priority and the selection priority 220 of the third MFP 53 stored in the usage table TB3 (FIG. 10) is given a high priority (S315). Accordingly, the sorting is completed as shown in the storage table TB1 of FIG. 13.

The mobile phone 10 selects the second MFP 52 for which, in the storage table TB1 (FIG. 13), the selection priority 220 has been set to "1", that is the topmost selection priority, and for which the flag 243 indicates that the MFP is a "selection candidate", as the temporarily selected MFP (S316). The mobile phone 10 transmits a notification executing instruction to the temporarily selected MFP (second MFP 52) (S317). Upon receiving the notification executing instruction from the mobile phone 10 (S231: YES), the second MFP 52 causes the indicator light 45 to be turned on (S233). When the user presses the OK button provided in the button input unit 17 of the mobile phone 10 (S417: YES), the temporarily selected MFP (the second MFP 52) is finalized as the object MFP (S431).

The mobile phone 10 registers the second MFP 52 that is the object MFP in the usage table TB3 (S433). The mobile phone 10 executes data communication with the object MFP (the second MFP 52) and transmits the print data (S437). The second MFP 52 receives the print data (S239: YES) and prints the print data using the printer 19 (S241). The flow is then finished.

In S417, when the Cancel button provided in the button input unit 17 of the mobile phone 10 is pressed in a state where the second MFP 52 is selected as the temporarily selected MFP (S417: NO), the MFP identification information 230 of the second MFP 52 is stored in the exclusion table TB2 (S425). The MFP identification information 230 of the second MFP 52 is deleted from the usage table TB3 (S427). An MFP (the first MFP 51), which has a lower priority than the selection priority 220 ("1", FIG. 13) of the current temporarily selected MFP (the second MFP 52) and for which is stored the flag 243 indicating that the MFP is a selection candidate, is selected as a next new temporarily selected MFP (S249).

Advantageous effects of the communication system 1 according to the example of the first embodiment described above will now be described. The communication system 1 can cause the temporarily selected MFP that is temporarily selected as a communication destination candidate to perform the temporarily selected state notifying action. Therefore, the user can readily recognize which MFP is temporarily selected by visual confirmation or the like. By performing a predetermined input to the mobile terminal device, the temporarily selected MFP can be finalized as the object MFP and data communication can be performed. Accordingly, the user is no longer required to be aware of identification information of the MFP to which the user desires to connect or to find out the identification information of the MFP and input the same to the mobile phone 10. Therefore, the object MFP can now be selected by a simple procedure.

With the communication system 1, when the temporarily selected MFP is not the MFP which the user desires to select as the communication destination, the temporal selection can be cancelled by executing the canceling action. Therefore, convenience for the user can be improved.

With the communication system 1, the cancellation information is arranged as direction information indicating a different direction from the direction information acquired in S10. Therefore, a temporal selection operation can be cancelled by a simple operation such as an action in which the mobile phone 10 having been held out is pulled back to an original location.

With the communication system 1, not only the relative direction 241 but the relative distance 242 is also used when selecting an object MFP. Therefore, even when a single object MFP cannot be selected using the relative direction 241 alone such as in a case where there is a plurality of MFPs having relative directions 241 consistent with the direction information, a single appropriate object MFP can be selected.

With the communication system 1, when the triggering condition is satisfied, the determination that the user intends to select the object MFP is made and identification of the object MFP is started. Therefore, a situation can be prevented where the object MFP is erroneously selected when the user does not intend to select the object MFP.

In the communication system 1, the location information of the mobile phone 10 is acquired when it is determined that the triggering condition has been satisfied. Accordingly, the object MFP can be identified based on the location information of the mobile phone 10 at a point where the triggering condition is satisfied. Therefore, even in a case where a network state varies dynamically such as when the user operates the mobile phone 10 while moving, the object MFP can be reliably identified.

With the communication system 1, an occurrence of an acceleration measured by the acceleration sensor 26 exceeding a threshold value is set as the trigger and direction information is calculated using the compass unit 25. Therefore, processing for selecting an object MFP can be executed in response to various actions of the user including the user waving the mobile phone 10 vertically and then holding the mobile phone 10 still, the user waving the mobile phone 10 horizontally and then holding the mobile phone 10 still, or the user holding the mobile phone 10 still in a posture in which the speaker 3 side tip of the mobile phone 10 is pointed outward.

While the first embodiment has been described in detail above, such description is for illustrative purposes only and is not intended to limit the scope and claims of the invention. Techniques described in the claims of the invention include various modifications and changes made to the specific example illustrated above.

For example, a configuration in which, in S10, the CPU 11 calculates information indicating a direction in which the speaker 3 side tip of the mobile phone 10 is located in relation to a reference location of the mobile phone 10 is not restrictive. As a first modification, in S10, the CPU 11 may calculate information indicating a direction in which the microphone side tip of the mobile phone 10 is located in relation to a reference location of the mobile phone 10. With such a modification, similar convenience to the first embodiment can be achieved in the user gripping the speaker 3 side of the mobile phone 10, waving the mobile phone 10 so that the microphone side tip points in the direction in which the MFP that the user desires as the data communication object exists, and then holding the mobile phone 10 still.

As a second modification, in S10, the CPU 11 may calculate information indicating a direction in which the installation face of the camera unit 27 on the mobile phone 10 is located in relation to a reference location of the mobile phone 10. With such a modification, similar convenience to the first embodiment can be achieved in the user gripping the mobile phone 10 so that the camera unit 27 points in the direction in which the MFP that the user desires as the data communication object exists, and then holding out the mobile phone 10 to stop the waving motion.

For example, the operation that satisfies the trigger condition is not limited to waving the mobile phone 10 and then holding the mobile phone 10 still. As a third modification, a configuration may be adopted in which the button input unit 17 is used as the operation unit and an operation for instructing photography using the camera unit 27 to be performed is used as the operation that satisfies the trigger condition. In this case, when the user activates the communication program 28, the camera unit 27 is activated and the panel 18 functions as an electronic viewfinder of the camera unit 27. Subsequently, in S9 in the flow shown in FIG. 2, the CPU 11 determines whether or not a user operation on the button input unit 17 with an intention to perform photography using the camera unit 27 (in other words, an operation satisfying the trigger condition) has been made. When the trigger condition is satisfied (S9: YES), in S10, the CPU 11 uses the compass unit 25 to calculate a direction in which the installation face of the camera unit 27 on the mobile phone 10 is located in relation to a reference location of the mobile phone 10 or, in other words, information indicating a direction in which the user viewing the panel 18 that is an electronic viewfinder had pointed the camera unit 27 during photography, and stores the same in the storage unit 12 as direction information.

A configuration may be adopted in which, in S9 and S10 in the third modification, the CPU 11 executes the same processing as in the second modification. With such a configuration, similar convenience to the first embodiment can be achieved by usage in which a user activates the communication program 28, and performs photography with the camera unit 27 pointed (or holding out the mobile phone 10) in the direction in which the MFP that the user desires as the object of data communication with the mobile phone 10.

As a fourth modification, a configuration may be adopted in which the acceleration sensor 26 is used as an operation unit and the mobile phone 10 kept oriented by the user in a same direction for a predetermined period of time is used as an operation that satisfies the trigger condition. In this case, when the user activates the communication program 28, in S9 in the flow of the mobile phone 10 shown in FIG. 2, the CPU 11 determines whether or not a predetermined period of time has elapsed without an acceleration measured by the acceleration sensor 26 exceeding a threshold value that is a value small enough that an intentional movement of the mobile phone 10 is inconceivable (in other words, whether or not an operation that satisfies a trigger condition has been performed). When the trigger condition has been satisfied (S9: YES), in S10, the CPU 11 executes the same processing as any of the first embodiment, the first modification, the second modification, and the third modification. In the same manner as in the third modification, when the user activates the communication program 28, the camera unit 27 may be activated and the panel 18 may function as the electronic viewfinder of the camera unit 27. With such a modification, similar convenience to the first embodiment can be achieved in the user activating the communication program 28, and holding the speaker 3 side tip of the mobile phone 10 (or the microphone side tip or the installation face of the camera unit 27) still for a predetermined period of time in the direction in which the MFP that the user desires as the object of data communication with the mobile phone 10 exists.

In the fourth modification, a configuration may be adopted in which, in S9, the CPU 11 determines whether or not a predetermined period of time has elapsed without a variation equal to or greater than a threshold value in the location information calculated by the GPS unit 24. A configuration may be adopted in which, in S9, a determination is made as to whether or not a predetermined period of time has elapsed without a variation equal to or greater than a threshold value in the information indicating an orientation acquired by the compass unit 25. Even with these configurations, similar convenience to the first embodiment can be achieved.

As a fifth modification, a configuration may be adopted in which the button input unit 17 (or a touch panel) or the microphone 4 is used as an operation unit and a predetermined input performed by the user to the button input unit 17 or the microphone 4 is used as an operation that satisfies the trigger condition. In this case, when the user activates the communication program 28, in S9 in the flow of the mobile phone 10 shown in FIG. 2, the CPU 11 determines whether or not a predetermined input has been made to the button input unit 17 (in other words, whether or not an operation satisfying the trigger condition has been performed). When the trigger condition has been satisfied (S9: YES), in S10, the CPU 11 executes the same processing as any of the first embodiment, the first modification, the second modification, and the third modification. In the same manner as in the third modification, when the user activates the communication program 28, the camera unit 27 may be activated and the panel 18 may function as an electronic viewfinder of the camera unit 27. With such a modification, similar convenience to the first embodiment can be achieved by usage in which a user activates the communication program 28, points the speaker 3 side tip (or the microphone side tip or the installation face of the camera unit 27) of the mobile phone 10 in a direction in which an MFP that the user desires as an object of data communication with the mobile phone 10 exists, and performs a predetermined input to the button input unit 17 or the microphone 4.

In the fifth modification, the predetermined input may be an input in which a directional button (not shown; for example, a front button may be associated with an angle of 0 degrees, a right button with an angle of 90 degrees rightward, a left button with an angle of 90 degrees leftward, and a rear button with an angle of 180 degrees) of the button input unit 17 (including a touch panel) is operated. Also in the fifth modification, the predetermined input may be an input to the button input unit 17 (touch panel) in which an indicator (a finger, a stylus pen, or the like) is slid in a predetermined direction (for example, a sliding motion in the longitudinal direction toward the speaker 3 side tip may be associated with an angle of 0 degrees, a rightward sliding motion in a transverse direction with an angle of 90 degrees rightward, a leftward sliding motion in a transverse direction with an angle of 90 degrees leftward, and a sliding motion in the longitudinal direction toward the microphone side tip may be associated with an angle of 180 degrees). Also in the fifth modification, the predetermined input may be a voice input indicating a direction to the microphone 4 (for example, an utterance of "front" may be associated with an angle of 0 degrees, an utterance of "right" with an angle of 90 degrees rightward, an utterance of "left" with an angle of 90 degrees leftward, and an utterance of "rear" with an angle of 180 degrees). Subsequently, after such input is performed, in S10, information indicating a direction obtained by adding an angle associated with the directional button operated by the user to information calculated by the CPU 11 may be stored in the storage unit 12 as direction information.

By adopting such a configuration, similar convenience to the first embodiment (with respect to a direction in which any of the speaker 3 side tip, the microphone side tip, and the camera unit 27 is pointed, an MFP existing e.g. to the right is selected as the temporarily selected MFP and an MFP existing e.g. to the left is not selected as the temporarily selected MFP) can be achieved by usage in which a user activates the communication program 28, points the speaker 3 side tip (or the microphone side tip or the installation face of the camera unit 27) of the mobile phone 10 in the direction in which the MFP that the user desires as the object of data communication with the mobile phone 10, and operates a directional button, slides a finger, or inputs an utterance into the microphone 4.

As a sixth modification, in S10, information indicating an orientation of the mobile phone 10 may be acquired using the acceleration sensor 26. Specifically, when one direction measured by the acceleration sensor 26 in S9 and an opposite direction of the one direction are on a same axis, a direction of the axis may be stored in the storage unit 12 as information indicating the orientation of the mobile phone 10.

As a seventh modification, a modification will be described in which, in S303 (FIG. 4), a plurality of MFPs does not exist in front of the user (S303: zero). In this case, an absence of selection candidate MFPs may be displayed on the panel 18 of the mobile phone 10 to end the flow. Alternatively, in this case, the absence of the selection candidate MFPs in the direction in which the user had waved the mobile phone 10 may be displayed on the panel 18 of the mobile phone 10. MFPs (first to third MFPs 51 to 53) connected to a wireless network formed by the access point 62 may be displayed as options on the panel 18. Subsequently, in S417, a selection input of an option may be received.

As an eighth modification, in S9 (FIG. 2), a determination that an operation by the user satisfies a trigger condition may be made subject to a detection of an acceleration measured by the acceleration sensor 26 equaling or exceeding a predetermined value. Accordingly, the trigger condition can be detected simply by a large acceleration being applied to the mobile phone 10. Therefore, an object MFP can be decided by having the user simply perform an operation of briskly waving the mobile phone 10 toward an MFP which the user wishes to set as an object of data communication. As a result, a need for performing an operation of holding the mobile phone 10 still after waving the mobile phone 10 can be eliminated.

For example, a configuration may be adopted in which, in S11, a plurality of network set values is acquired (for example, by receiving a probe response from a plurality of access points), and the plurality of access points is accessed using the set values. In this case, the CPU 11 acquires a plurality of network set values in S11. Subsequently, processing is repeated which includes, in S13, accessing an access point using one of the acquired set values, and in S15, executing a flow for acquiring a relative direction and a relative distance, whereby every time a relative direction and a relative distance are acquired, the relative direction and the relative distance are additionally stored in the storage table TB1. Such a configuration enables an object MFP to be selected not only from MFPs connected to one network but also from MFPs connected to other networks. A configuration may be adopted in which, for example, an acquisition of a network set value in S11 involves temporarily storing a network set value stored in advance in the set value storage area 12*a* of the mobile phone 10 in a work area of the CPU 11.

In a case where, despite a determination is made in S9 in that an operation satisfying the trigger condition has been performed (S9: YES), the mobile phone 10 does not perform data communication with an object MFP in S23 and a connection between a network accessed by the mobile phone 10 and the mobile phone 10 is cut off, it is unnecessary to discard a value of the storage table TB1 stored in S15 and once again determine in S9 that an operation satisfying the trigger condition has been performed, and processing may be restarted from S10. Accordingly, even in a situation where network connection is susceptible to interruptions such as when the user operates the mobile phone 10 while moving so as to approach an MFP which the user desires as an object of data communication with the mobile phone 10, since the acquisition of the direction information and the acquisition of the relative direction and the relative distance are performed without the user having to once again perform the operation for satisfying the trigger condition, data communication can be performed between an MFP existing in the direction desired by the user and the mobile phone 10.

A determination that an operation satisfying the trigger condition has been performed need not be made once again in S9 after discarding a value of the storage table TB1 stored in S15, and processing may be restarted from S11. Accordingly, even in a situation where network connection is susceptible to interruptions such as when the user first performs the operation indicating the direction of an MFP which the user desires as the object of data communication with the mobile phone 10 and then holds the mobile phone 10 in a manner that is arbitrary to the user and approaches the desired MFP, the acquisition of the relative direction and the relative distance are performed without the user having to once again perform the operation for satisfying the trigger condition. Therefore, data communication can be performed between an MFP existing in the direction desired by the user and the mobile phone 10.

For example, processing of S11 to S13 may be regularly executed in response to power activation of the mobile phone 10, and when the trigger condition is satisfied (S9: YES), processing of S10 and then S15 may be executed. For example, processing of S11 to S15 may be regularly executed in response to power activation of the mobile phone 10, and when the trigger condition is satisfied (S9: YES), processing of S10 and then S21 may be executed.

For example, with respect to the MFP decided as the object MFP in S21, the wireless transceiver unit 15 may be configured to execute processing for transmitting a notification which notifies that the MFP has been decided as the object MFP. Subsequently, when a reply signal such as an ACK signal is not received within a predetermined period of time, the wireless transceiver unit 15 may be configured to execute processing for deciding another MFP as the object MFP and retransmitting the notification to the newly decided object MFP. Accordingly, communication with the object MFP can be performed more reliably.

For example, a configuration may be adopted in which the server 71 regularly receives identification information and information indicating the physical location from the first and second MFPs 51 and 52 respectively and stores the information in the storage unit 73. In this case, upon receiving first data transmitted by the mobile phone 10 in S111, the server 71 returns second data including the stored identification information and information indicating a physical location of the first and second MFPs 51 and 52 to the mobile phone 10. The second data returned by the server 71 includes identification information of the mobile phone 10 for indicating the destination, identification information (IP address) of the server 71 for indicating the source, and return information which indicates that the data is second data. In this case, upon receiving by the wireless transceiver unit 15, in S113, the second data transmitted by the server 71, the CPU 11 of the mobile phone 10 extracts MFP identification information and information indicating the physical location from the second data in S115 and temporarily stores the information in the storage table TB1.

In the first embodiment, the mobile phone 10 communicates with the first to third MFPs 51 to 53 via the access point 62 by wireless communication 200 conforming to the wireless LAN infrastructure mode. Alternatively, a configuration may be adopted in which the mobile phone 10 directly communicates with the first to third MFPs 51 to 53 by wireless communication 200 conforming to Bluetooth (registered trademark). In this case, the first to third MFPs 51 to 53 are in states capable of responding to the search while conforming to Bluetooth. In S11, the CPU 11 of the mobile phone 10 receives a response including an MFP Bluetooth address (a type of identification information which is also referred to as an BD address) from the MFPs existing at a distance in which wireless communication conforming to Bluetooth can be performed with the mobile phone 10 (in other words, first to third MFPs 51 to 53). Specifically, for example, a search according to SDAP (Service Discovery Application Profile) is performed and a response is received from a device that provides a printer function and a scanner function (in other words, an MFP). Then, in S13, a connection is made to the first MFP 51 according to connection processing conforming to Bluetooth. Subsequently, in S15, a relative direction and a relative distance are acquired from the connected MFP. In this case, in S111, instead of broadcasting the first data, the wireless transceiver unit 15 may be configured to execute processing for transmitting first data including a Bluetooth address of the connected MFP in order to indicate a destination. Subsequently, a return is made to S13 to make a connection to the second MFP 52, S15 is executed, a return is made to S13 to make a connection to the third MFP 53, and S15 is executed (in other words, processing of S13 and S15 is executed for all MFPs existing in a distance over which wireless communication can be performed). Thereafter, the object MFP is identified in S431 and data communication is executed with the object MFP in S437. In a configuration in which communication is directly performed with the first to third MFPs 51 to 53, wireless communication which conforms to a wireless LAN ad-hoc mode (a mode in which a plurality of wireless LAN terminal devices perform direct data communication without access points) can be used instead of Bluetooth.

A second embodiment will now be described. The second embodiment is a mode in which another example of finalization processing is used in the communication system 1 illustrated in FIG. 1. A predetermined sequence when sequentially selecting the first to third MFPs 51 to 53 is stored in advance in the set value storage area 12a. As an example, a case will be described in the second embodiment in which a predetermined sequence expressed as the first MFP 51, the second MFP 52, the third MFP 53, the first MFP 51 . . . is stored. As an example, a case will be described in which the first MFP 51 is selected as an object MFP. Since the second embodiment is otherwise configured the same as the communication system 1 according to the first embodiment, a detailed description will be hereby omitted.

Figure 3:
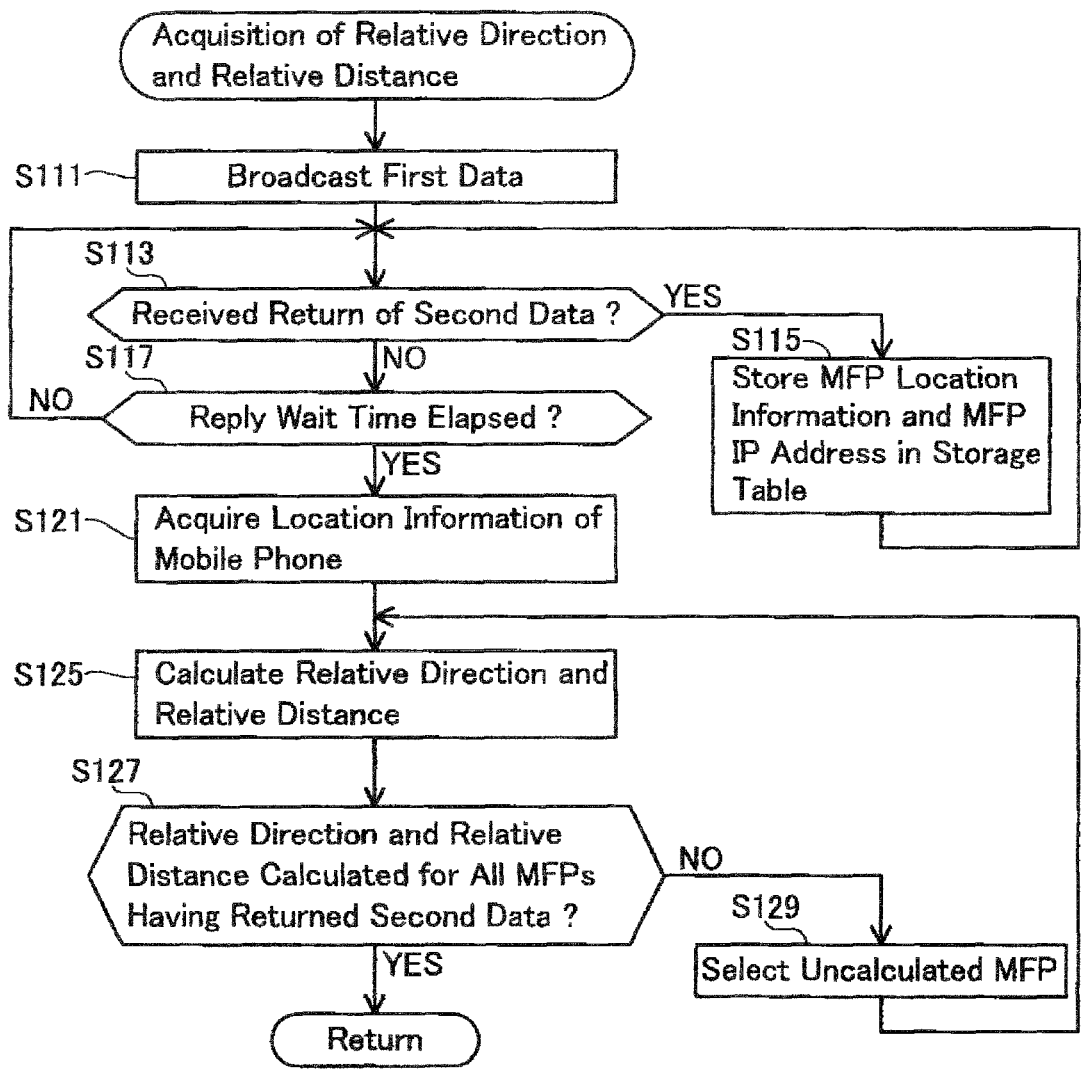
FIG. 3 is a diagram showing a second operation flow chart of the mobile phone.
Figure 14:
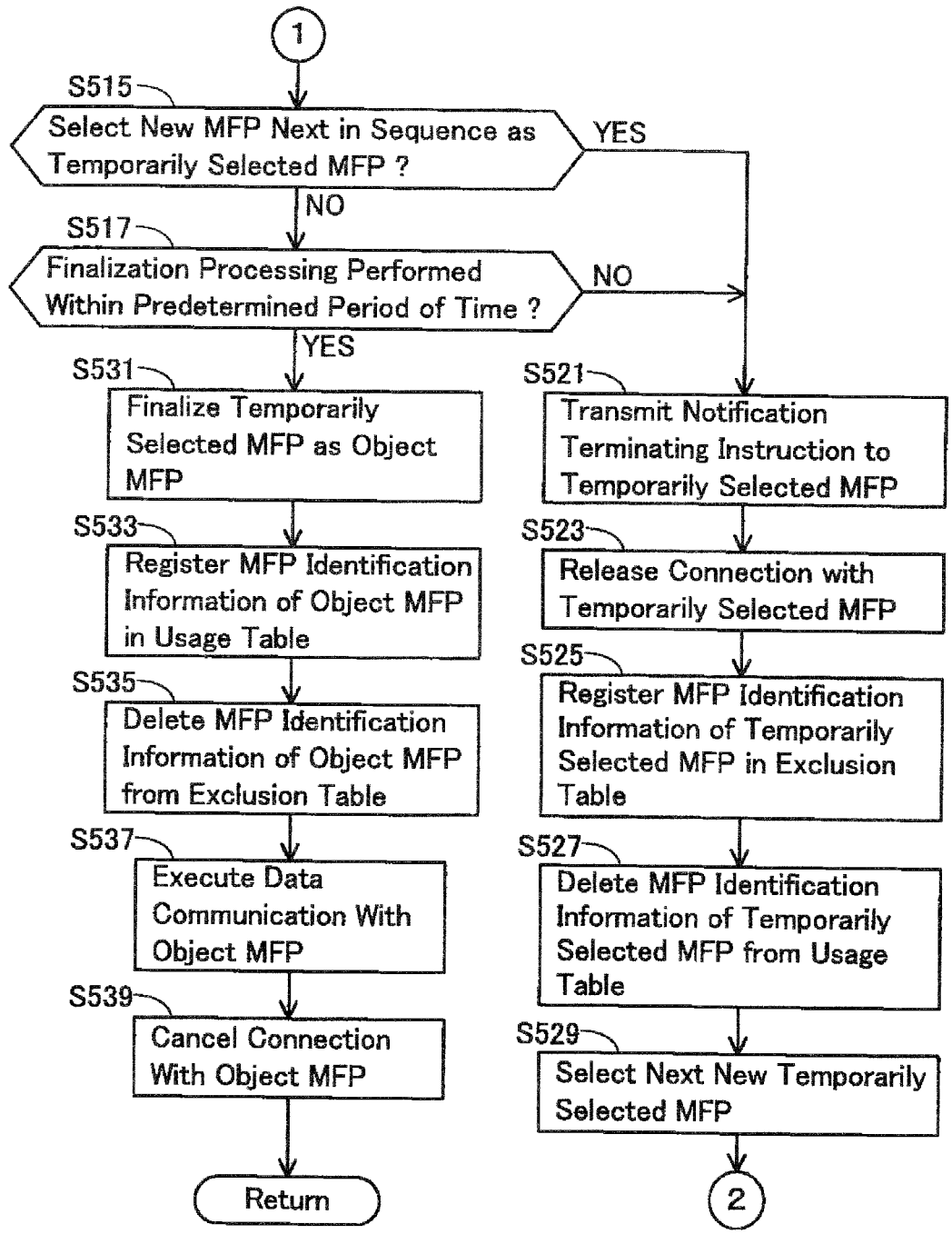
FIG. 14 is a diagram showing a fifth operation flow chart of the mobile phone.

A specific example of operations of the communication system 1 according to the second embodiment will now be described with reference to FIGS. 2 to 6 and the flow chart shown in FIG. 14. FIG. 14 shows a flow performed by the mobile phone 10. The operation flow shown in FIG. 14 is a flow that is performed in place of the operation flow shown in FIG. 5 in the first embodiment. Here, since operations shown in FIGS. 2 to 4 are the same as in the first embodiment, a detailed description will be omitted. In S515 in FIG. 14, the CPU 11 causes a description of "Select new MFP next in sequence as a temporarily selected MFP?" to be displayed on the panel 18 of the mobile phone 10. When the YES button of the button input unit 17 is pressed (S515: YES), the CPU 11 advances to S521, and when the NO button is pressed (S515: NO), the CPU 11 advances to S517.

In S517, the CPU 11 determines whether or not finalization processing has been performed within a predetermined period of time. The predetermined period of time may be determined in advance by the user or the like and stored in the set value storage area 12a. When the finalization processing had not been performed within the predetermined period of time (S517: NO), the CPU 11 advances to S521. Here, since contents of operations in S521 to S529 in FIG. 14 are the same as the contents of operations in S421 to S429 in FIG. 5, a detailed description will be hereby omitted. Accordingly, when the predetermined period of time elapses (S517: NO) without selection of an MFP that is next in order (S515: NO), the MFP having the next predetermined sequence is automatically selected as the new temporarily selected MFP (S529).

On the other hand, in S517, when the OK button is pressed within the predetermined period of time and the finalization processing is performed (S517: YES), the CPU 11 advances to S531. Here, since contents of operations in S531 to S539 in FIG. 14 are the same as the contents of operations in S431 to S439 in FIG. 5, a detailed description will be hereby omitted. Accordingly, an action is performed for finalizing the MFP being selected as the temporarily selected MFP at the point where the OK button is pressed as the object MFP.

As described above, the communication system 1 according to the second embodiment turns on the indicator light 45 for a predetermined period of time for each occasion in the predetermined sequence expressed as the first MFP 51, the second MFP 52, the third MFP 53, the first MFP 51, . . . and so on. Subsequently, by having the user press the OK button of the mobile phone 10 at a timing when the indicator light 45 of the first MFP 51 with which the user desires to perform data communication is being turned on, the first MFP 51 can be selected as the object MFP. Accordingly, since an action that sequentially temporarily selects MFPs is automatically performed by the mobile phone 10, the object MFP can be decided by pressing the OK button at the timing when the indicator light 45 of the MFP which the user desires to select is on. Therefore, convenience of the user can be improved.

In the operation example according to the second embodiment, a temporal selection action by the user is not required. Therefore, the flow for temporal selection can be omitted. Specifically, in the flow shown in FIG. 2, the acquisition of direction information (S17) can be omitted. In the flow shown in FIG. 3, the calculation of the relative direction and the relative distance (S125) can be omitted. In the flow shown in FIG. 4, the flow for selecting an MFP having the highest selection priority 220 (S311 to S315) can be omitted.

Figure 15:
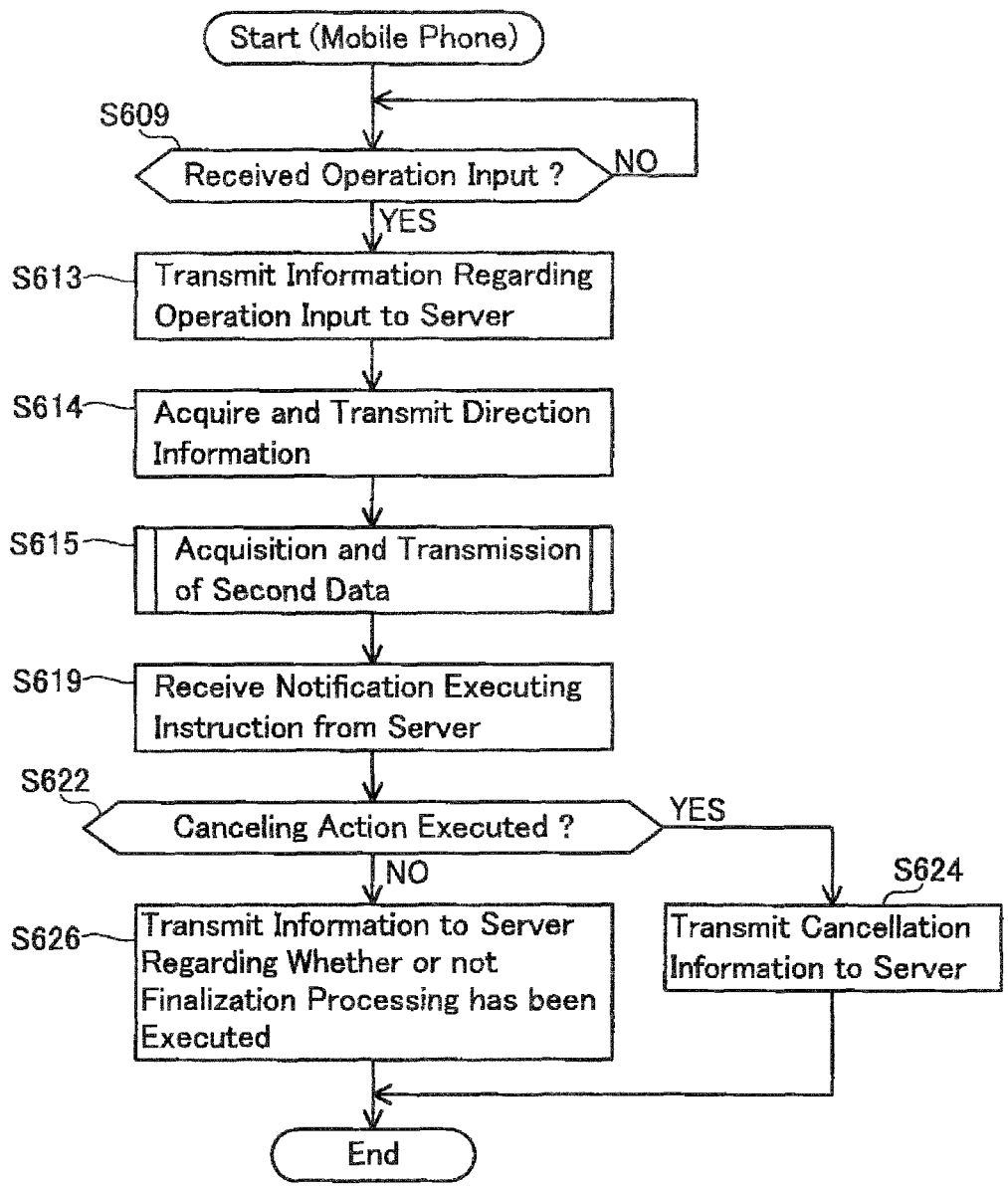
FIG. 15 is a diagram showing a sixth operation flow chart of the mobile phone.
Figure 16:
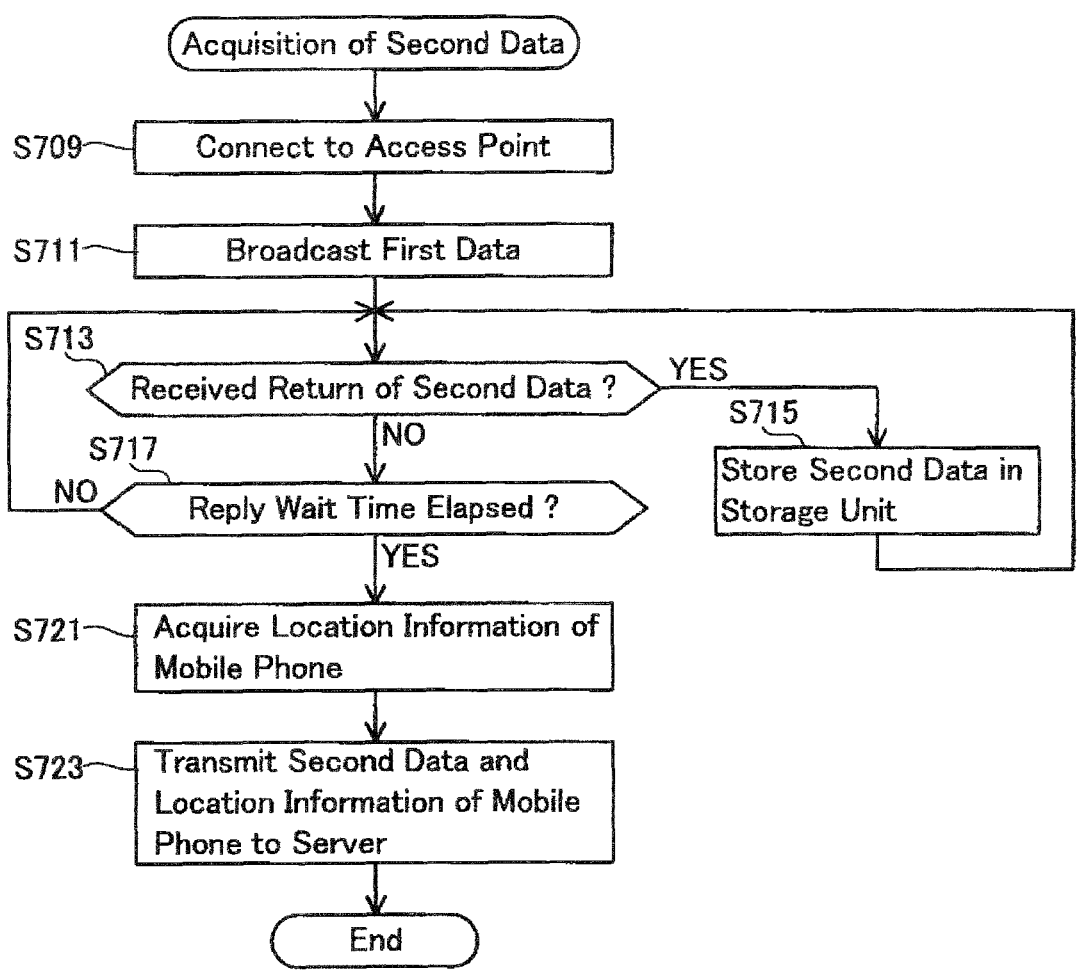
FIG. 16 is a diagram showing a seventh operation flow chart of the mobile phone.
Figure 17:
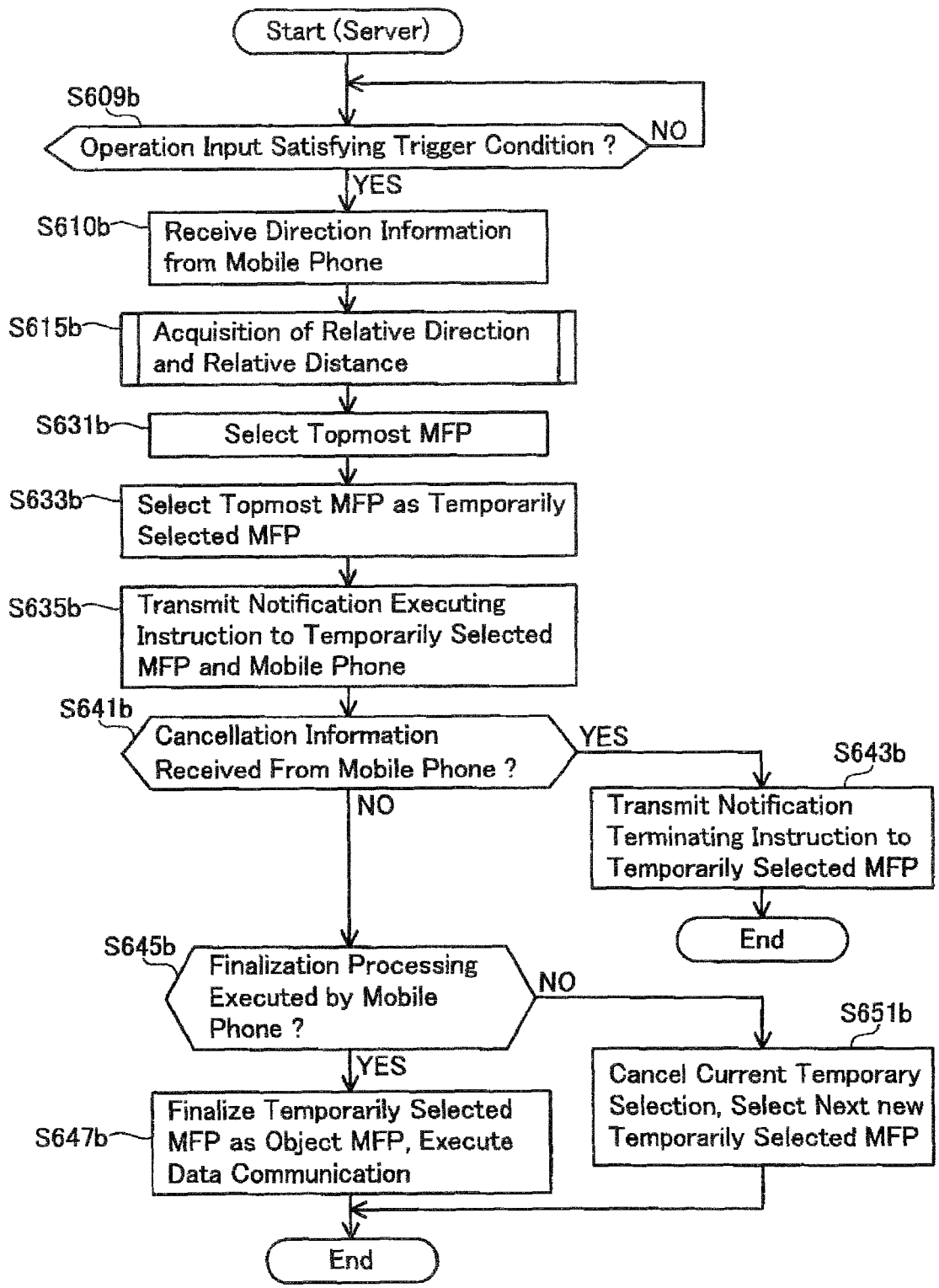
FIG. 17 is a diagram showing a first operation flow chart of a server.
Figure 18:
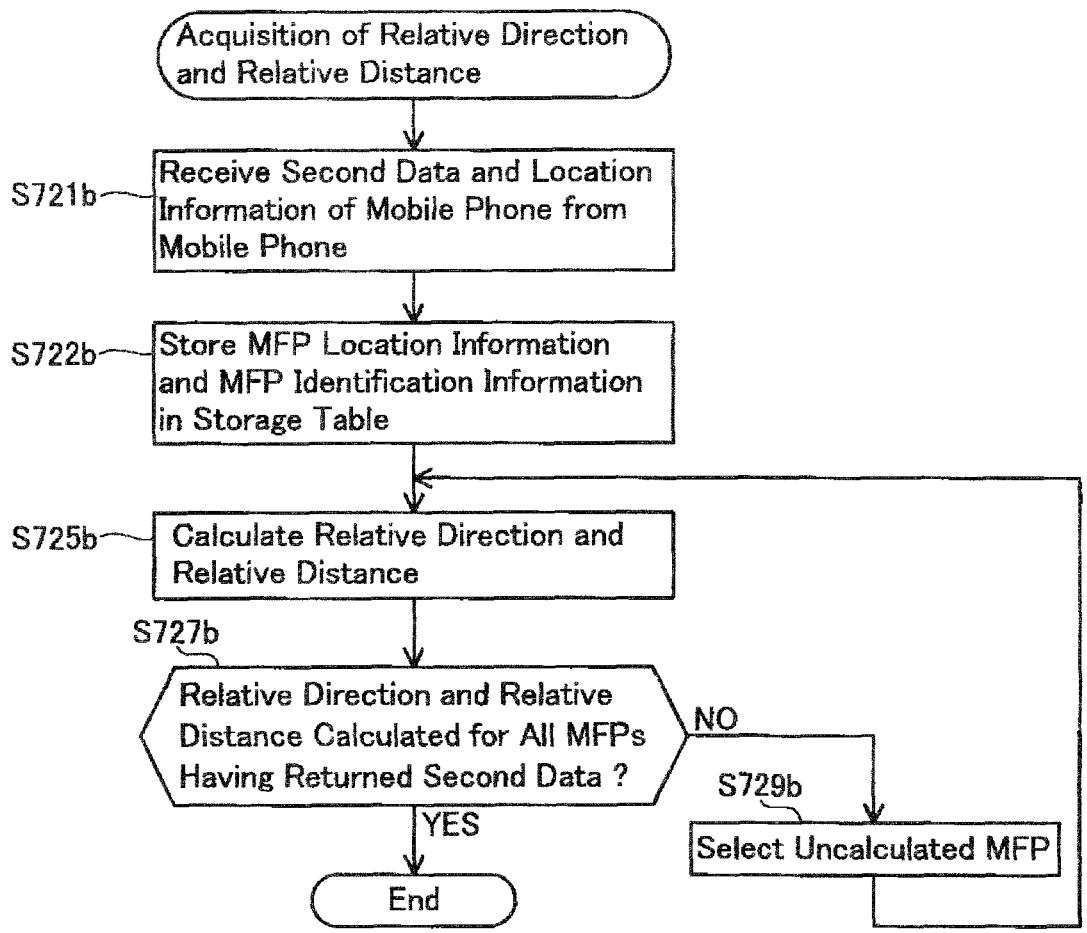
FIG. 18 is a diagram showing a second operation flow chart of the server.

A third embodiment will now be described. In the third embodiment, a server 71 is used in the communication system 1 illustrated in FIG. 1. Processing that is performed by the mobile phone 10 in the first embodiment is divided in the third embodiment between a server and a mobile phone 10. A storage unit 73 of the server 71 stores a storage table TB1. Operations of the communication system 1 according to the third embodiment will now be described with reference to FIGS. 15 to 18. FIGS. 15 and 16 show flows performed by the mobile phone 10. FIGS. 17 and 18 show flows performed by the server 71.

Flows performed by the mobile phone 10 will be described. In S609 in FIG. 15, a CPU 11 of the mobile phone 10 determines whether or not an operation unit (an acceleration sensor 26, a compass unit 25, a button input unit 17, or the like) has received an operation input by a user. When an operation input has not received (S609: NO), the CPU 11 returns to S609. On the other hand, when an operation input has been received (S609: YES), the CPU 11 advances to S613. In S613, the CPU 11 causes the wireless transceiver unit 15 to transmit information regarding the operation input (information indicating an orientation acquired by the compass unit 25, an acceleration measured by the acceleration sensor 26, image data acquired by the camera unit 27, or the like) to the server 71 via wireless communication 200, an access point 62, and the Internet 70.

In S614, the CPU 11 uses an API to acquire information indicating the orientation of the mobile phone 10 from the compass unit 25. The CPU 11 then calculates direction information and stores the same in the storage unit 12. The CPU 11 causes the wireless transceiver unit 15 to execute processing for transmitting the direction information to the server 71 via wireless communication 200, the access point 62, and the Internet 70.

In S615, the CPU 11 executes acquisition and transmission of second data. Detailed contents of the flow for acquiring and transmitting the second data will now be described with reference to FIG. 16. In S709, the CPU 11 performs wireless communication 200 conforming to an infrastructure mode with the access point 62. In S711, using the wireless transceiver unit 15, the CPU 11 broadcasts first data by wireless communication 200 conforming to the wireless LAN infrastructure mode. Consequently, first to third MFPs 51 to 53 receive the first data via an access point. In S713, the CPU 11 determines whether the second data has been returned from the first to third MFPs 51 to 53. Specifically, a determination is made on whether or not data including the identification information of the mobile phone 10, MFP identification information (IP address), and return information has been received. When the second data has been received (S713: YES), the CPU 11 advances to S715 to temporarily store the second data in the storage table TB1.

On the other hand, when the second data has not been received (S713: NO), the CPU 11 advances to S717 to determine whether or not a reply wait time for the second data has elapsed. When the reply wait time had not elapsed (S717: NO), the CPU 11 returns to S713, and when it had elapsed (S717: YES), the CPU 11 advances to S721. In S721, the CPU 11 acquires location information of the mobile phone 10 calculated by the GPS unit 24. The acquired location information of the mobile phone 10 is temporarily stored in the storage unit 12. In S723, the CPU 11 causes the wireless transceiver unit 15 to execute processing for transmitting the second data and the location information of the mobile phone stored in the storage unit 12 to the server 71. The acquisition flow of second data is finished and a return is made to S619 (FIG. 15).

In S619, the CPU 11 receives a notification executing instruction from the server 71. In S622, the CPU 11 determines whether or not a canceling action of the temporal selection has been executed by the user. When the canceling action has been executed (S622: YES), the CPU 11 advances to S624 to cause the wireless transceiver unit 15 to execute processing for transmitting cancellation information to the server 71. On the other hand, when the canceling action has not been executed (S622: NO), the CPU 11 advances to S626 to cause the wireless transceiver unit 15 to execute processing for transmitting information on whether or not finalization processing has been executed by the mobile phone 10 to the server 71. The flow performed by the mobile phone 10 is then finished.

A flow performed by the server 71 will be described. In S609b in FIG. 17, a CPU 72 of the server 71 determines whether or not an operation input received from the mobile phone 10 satisfies the trigger condition. When the trigger condition is not satisfied (S609b: NO), the CPU 72 returns to S609b, and when the trigger condition is satisfied (S609b: YES), the CPU 72 advances to S610b. In S610b, the CPU 72 receives the direction information from the mobile phone 10.

In S615b, the CPU 72 executes a flow for acquiring the relative direction and the relative distance. Detailed contents of the flow for acquiring the relative direction and the relative distance will be described with reference to FIG. 18. In S721b, the CPU 72 receives the second data and location information of the mobile phone 10 from the mobile phone 10 and causes the storage unit 73 to store the same. In S722b, the CPU 72 extracts the IP addresses 232 of the MFPs and the MFP location information 240 from the second data. The CPU 72 associates the MFP location information 240 and the IP address 232 to each MFP and causes the storage table TB1 of the storage unit 73 to store the same. In S725b, the CPU 72 calculates the relative direction 241 and the relative distance 242. The calculation of the relative direction 241 and the relative distance 242 is performed based on the location information of the mobile phone 10 and the MFP location information 240 stored in the storage unit 73. The calculated relative direction and relative distance are temporarily stored in the storage table TB1 as the relative direction 241 and the relative distance 242 of the MFP.

In S727b, the CPU 72 determines whether or not the relative direction 241 and the relative distance 242 have been calculated for all MFPs which have returned the second data. If calculated (S727b: YES), the CPU 72 ends the flow, and if not calculated (S727b: NO), the CPU 72 advances to S729b. In S729b, the CPU 72 selects an MFP for which the relative direction and the relative distance have not been calculated and then returns to S725b. Accordingly, the relative direction 241 and the relative distance 242 can be acquired for all MFPs which have returned the second data.

Returning now to the flow shown in FIG. 17, in S631b, the CPU 72 performs a flow for selecting an MFP having a highest selection priority 220. Since details of S631b are the same as those of S301 to S315 in FIG. 4, a description thereof will be omitted. In S633b, the CPU 72 selects the MFP having the highest selection priority 220 and for which is stored the flag 243 indicating that the MFP is a selection candidate as a temporarily selected MFP. In S635b, the CPU 72 causes the communication unit 74 to execute processing for transmitting a notification executing instruction to the temporarily selected MFP and the mobile phone 10 via the Internet 70 and the access point 62.

In S641b, the CPU 72 determines whether or not cancellation information has been received from the mobile phone 10. If the cancellation information has been received, the CPU 72 advances to S643b and causes the communication unit 74 to execute processing for transmitting a notification terminating instruction to the temporarily selected MFP. On the other hand, when the cancellation information has not been received, the CPU 72 advances to S645b and determines whether or not finalization processing has been executed by the mobile phone 10.

When it is determined that finalization processing has been executed (S645: YES), the CPU 72 advances to S647b to finalize the temporarily selected MFP as the object MFP and to execute data communication. Since details of S647b are the same as those of S431 to S439 in FIG. 5, a description thereof will be omitted. On the other hand, in S645, when it is determined that finalization processing has not been executed (S645: NO), the CPU 72 advances to S651b to release the current temporal selection and select a next new temporarily selected MFP. Since details of S651b are the same as those of S421 to S429 in FIG. 5, a description thereof will be omitted. The flow performed by the server 71 is then finished.

As described above, with the communication system 1 according to the illustrated example of the third embodiment, parts of processing for acquiring a relative direction and a relative distance, processing for selecting the temporarily selected MFP, processing for identifying the object MFP, or the like can be performed by the server 71. As a result, a burden of processing on the mobile phone 10 and the first to third MFPs 51 to 53 can be reduced.

While specific embodiments of the present invention have been described in detail above, such description is for illustrative purposes only and is not intended to limit the scope and claims of the invention. Techniques described in the claims of the invention include various modifications and changes made to the specific examples illustrated above.

Modifications

In the third embodiment, various paths may exist along which the server 71 acquires the MFP location information 240, the MFP identification information 230, location information of the mobile phone 10, and the like. In the third embodiment, while the server 71 receives second data including the MFP location information 240 and the MFP identification information 230 from the mobile phone 10, such a mode is not restrictive. For example, MFP location information 240 for each of the first to third MFPs 51 to 53 may be stored in advance in the storage unit 73 of the server 71. The server 71 may receive only location information of the mobile phone 10 from the mobile phone 10. In this case, the server 71 may be configured to search MFPs existing around the mobile phone 10 by comparing the location information of the mobile phone 10 with the MFP location information 240. Accordingly, by transmitting the location information of the mobile phone 10 to the server 71, MFP location information 240 and identification information of MFPs existing around the mobile phone 10 can be received from the server 71. As a result, since the first to third MFPs 51 to 53 need not include a location measuring device such as the GPS unit 44, a simplified configuration can be achieved.

Methods of deciding a relative direction 241 are not limited to the method of S125. Alternatively, the relative direction 241 may be identified based on radio wave characteristics when the mobile phone 10 receives data from the MFP. Specific examples include providing the mobile phone 10 with a directional antenna to obtain a relative direction 241 of an MFP transmitting radio waves. A method is conceivable in which the mobile phone 10 includes a plurality of antennas, and a relative direction 241 of an MFP transmitting radio waves can be obtained from a time lag in radio wave reception. As a result, a relative direction 241 can be acquired even when location information of the mobile phone 10 or MFP location information 240 cannot be acquired.

Methods of deciding a relative distance 242 are not limited to the method of S125. A relative distance 242 may be calculated based on a radio field intensity of wireless communication. As a result, a relative distance 242 can be acquired even when location information of the mobile phone 10 or MFP location information 240 cannot be acquired.

Embodiments of the present teachings is not limited to the configuration in which the mobile phone 10 receives information indicating a physical location from an MFP, and stores the information in the storage table TB1 without modification as the MFP location information 240 of the MFP. Alternatively, the physical location received from the MFP may be converted to any data format that can easily be processed by the mobile phone 10, and then may be stored as the MFP location information 240 in the storage table TB1.

In S303, the CPU 11 determines the number of MFPs (MFPs existing in front of the user of the mobile phone 10) of which a difference between a direction indicated by a horizontal component of the relative direction 241 and a direction indicated by a horizontal component of the direction information is less than 90 degrees (in other words, in a direction pointed by the speaker 3 side tip of the mobile phone 10 or in front as seen from the user of the mobile phone 10). The MFPs counted in S313 are not limited to those with the difference between the direction indicated by the horizontal component of the relative direction 241 and the direction indicated by the horizontal component of the direction information is less than 90 degrees (e.g., within 90 degrees to the right side from a direction pointed by the speaker 3 side tip of the mobile phone 10). MFPs within minus 90 degrees (e.g.) may also be counted (e.g., within 90 degrees to the left side from a direction pointed by the speaker 3 side tip of the mobile phone 10). The difference between the direction indicated by the horizontal component of the relative direction 241 and the direction indicated by the horizontal component of the direction information is not limited to 90 degrees; it may be an angle smaller than 90 degrees (e.g. 60 degrees). 60 degrees is an angle included within 90 degrees.

A device having a communication function such as a notebook personal computer can be used instead of the mobile phone 10. In this case, the communication program 28 may be various driver software installed in the notebook personal computer. The number of MFPs connected to the communication system need not be limited to three and a large number of MFPs may exist. Communication between the access point 62 and the first to third MFPs 51 to 53 is not limited to a wireless LAN method and a wired LAN method may be used instead.

The external input receiving module for inputting direction information is not limited to the acceleration sensor 26 or the compass unit 25. Direction information may be inputted using direction keys provided in the button input unit 17 by pressing a button of a corresponding direction. In this case, a canceling action may be performed by pressing a button of a direction opposite to the corresponding direction or pressing a button of a direction perpendicular to the corresponding direction. In a case where the panel 18 is a touch panel, the direction information may be inputted by sliding a fingertip on the panel 18 in the corresponding direction. In this case, a canceling action may be performed by touching any location on the panel 18. In a case where the mobile phone 10 is provided with a 3D sensor or the like, direction information may be inputted by a motion of the fingertip or the like without having to touch the panel 18. In this case, the canceling action may be performed by moving the fingertip in a direction opposite to the corresponding direction or in a direction perpendicular to the corresponding direction. Direction information may be inputted by using a microphone unit of the mobile phone to issue a voiced instruction. Direction information may be inputted by using the camera unit 27 to photograph an MFC existing in the corresponding direction. In this case, the canceling action may be performed by pointing the camera unit 27 in a direction that differs from the corresponding direction.

Various modifications exist for the method of deciding an object MFP. For example, in a case where only one MFP exists in front of the user (S303: one) in the flow shown in FIG. 4, the CPU 11 may decide the MFP as the object MFP in S306 and subsequently advance to S433 or S533. When a plurality of MFPs exists in front of the user (S303: plurality), MFPs that are not selection objects (MFPs not existing in front of the user) can be deleted from the storage table TB1 in S304. Processing of S314 and thereafter may be performed only on MFPs remaining in the storage table TB1. Accordingly, an object MFP can be decided without using the flag 243.

Various modifications exist for the method of sorting the selection priorities 220. For example, in place of the processing of S314 to S315 (FIG. 4), processing may be performed in which the selection priorities (selection priority group A) are decided only among MFPs stored in the exclusion table TB2 (or MFPs not stored in the usage table TB3) and the selection priorities (selection priority group B) are decided only among the MFPs stored in the exclusion table TB2 (in other words, the MFPs not stored in the usage table TB3). Subsequently, processing for sorting selection priorities 220 of MFPs stored in the storage table TB1 may be performed so that a next priority of a lowest priority in the selection priority group A becomes the highest priority among the selection priority group B.

In S417, the operation to instruct the finalization of the object MFP may be inputted by the user operating a panel (operation unit) of the MFP that has been selected as the temporarily selected MFP. In this case, the MFP into which the operation by the user is inputted may send information indicating that the aforesaid operation has been inputted to the mobile phone 10. With the mobile phone 10 receiving the information indicating that the aforesaid operation has been inputted, the finalization processing is completed.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

Each program may be constituted by a single program module or by a plurality of program modules. Each example may adopt another replaceable configuration which is within the context of the present invention. Adoptable configurations include a computer (the CPU 11 or the like) which executes processing based on a program (the communication program 28 or the like), a computer which executes processing based on a program other than an image processing program such as an operating system and other applications, a hardware configuration (the panel 18 or the like) which operates according to an instruction by a computer, and a configuration in which a computer and a hardware configuration work in conjunction with each other. Obviously, adoptable configurations also include a computer which executes processing by coupling processing based on a plurality of programs, and a hardware configuration which operates according to an instruction by a computer which executes processing by coupling processing based on a plurality of programs.

What is claimed is:

1. A non-transitory computer-readable recording device storing a computer program including instructions for causing a computer of a mobile device to perform:
   causing a storage of the mobile device to store first information indicating a physical location of the mobile device;
   causing the storage to further store second information indicating a specific direction which had been specified by a first operation received by an operation hardware, the operation hardware being at least one of: a compass; an acceleration sensor; and a user interface configured to receive an operation on the mobile device by a user;
   causing the storage to further store third information indicating one or more location information relating to one or more communication devices, respectively, the third information being received via a wireless network by a communication interface configured to communicate using the wireless network;
   causing the storage to further store first identification information identifying a first communication device for which a selection priority is to be raised;
   causing the storage to further store second identification information identifying a second communication device for which the selection priority is to be lowered;

sequentially conducting a first processing, a second processing, and a sorting processing for sorting the selection priority, the first processing including:

calculating a relative direction between the mobile device and each of the one or more communication devices based on the first information and the second information, the relative direction being a direction based on the specific direction;

assigning a selection priority to each of the one or more communication devices based on the relative direction, so that when a difference between the specific direction and the relative direction of one communication device is smaller than the difference between the specific direction and the relative direction of another communication device, the selection priority assigned to the one communication device is higher than the selection priority assigned to the another communication device; and assigning all communication devices having a difference between the specific direction and the relative direction less than a predetermined angle as specific communication devices;

the second processing including:

calculating a relative distance between the mobile device and each of the one or more communication devices based on the first information and the third information;

reassigning the selection priority to each of the one or more specific communication devices based on the relative distance so that when a relative distance of one specific communication device is smaller than the relative distance of another specific communication device, the selection priority assigned to the one specific communication device is higher than the selection priority assigned to the another specific communication device;

the sorting processing including sorting the selection priority of the one or more communication devices where when a communication device is the first communication device, the selection priority is raised by reassigning the selection priority to a higher selection priority and when a communication device is the second communication device, the selection priority is lowered by reassigning the selection priority to a lower selection priority; whereby when there are two or more communication devices, and when two communication devices are the first communication device and the second communication device, respectively, the selection priority of the first communication device is higher than the selection priority of the second communication device, selecting one specific device to which a highest selection priority has been assigned as a temporarily selected candidate device;

controlling the communication interface such that the communication interface sends a first instruction to the temporarily selected candidate device, the first instruction being an instruction that makes the temporarily selected candidate device perform a temporarily selected state notifying action for notifying that the temporarily selected candidate device has been selected, the temporarily selected state notifying action being at least one of: lighting an indicator light of the temporarily selected candidate device; causing a panel of the temporarily selected candidate device to display a notification message; and moving a movable part of the temporarily selected candidate device;

determining the temporarily selected candidate device as an object device when: a second operation is received for determining the object device by the user interface within a predetermined first period of time; or a third operation for canceling the selection of the temporarily selected candidate device is not received by the user interface within a predetermined second period of time;

controlling the communication interface such that the communication interface communicates with the object device in a case where the object device is determined; and selecting another specific device to which a second highest selection priority is assigned as the temporarily selected candidate device, when: the second operation is not received by the user interface within the first period of time; or the third operation is received by the user interface or the operation hardware.

2. The non-transitory computer-readable recording device as in claim 1, wherein the instructions cause the computer to further perform:

controlling the communication interface such that the communication interface sends a second instruction to the temporarily selected candidate device in a case where the third operation is received within the second predetermined period of time, and the second instruction is an instruction that makes the temporarily selected state notifying action to be terminated.

3. The non-transitory computer-readable recording device as in claim 1, wherein the instructions cause the computer to further perform determining a triggering condition for selecting the one specific device is satisfied in a case where a direction of the mobile device obtained by the compass provided in the mobile device is maintained substantially in the same direction over a predetermined third period of time.

4. The non-transitory computer-readable recording device as in claim 1, wherein the instructions cause the computer to further perform determining a triggering condition for selecting the one specific device is satisfied in a case where an acceleration measured by the acceleration sensor provided in the mobile device exceeds a predetermined value.

5. The non-transitory computer-readable recording device as in claim 1, wherein the instructions cause the computer to further perform:

controlling the communication interface to send the second instruction to terminate the temporarily selected state notifying action to the temporarily selected candidate device for having received an input to cancel the temporal selection in a case where fourth information indicating a direction that is different from the specific direction indicated by the second information is input to the operation hardware after the storage stores the second information.

6. The non-transitory computer-readable recording device as in claim 1, wherein the operation hardware includes the user interface and the acceleration sensor, and the acceleration sensor detects the first operation to the third operation, and the user interface is also configured to detect the second operation, the first operation is waving the mobile device toward the object device and then held still, the second operation is holding the mobile device still after the mobile device is waved toward the object device or an OK button provided at the user interface being pressed, and the third operation is starting to wave the mobile device toward a different direction from the specific direction.

7. The non-transitory computer-readable recording device as in claim 1, wherein the operation hardware includes the user interface and the acceleration sensor, and the acceleration sensor detects the first operation to the third operation, and the user interface is also configured to detect the second operation, the first operation is holding out the mobile device toward the object device and then held still, the second operation is holding the mobile device still for a predetermined third period of time, or an OK button provided at the user interface being pressed and the third operation is restoring the mobile device that had been held out to its original location.

8. The non-transitory computer-readable recording device as in claim 1, wherein the operation hardware includes the user interface, the acceleration sensor and the compass, the acceleration sensor detects the first operation and the third operation, the first operation is holding the mobile device still for a predetermined third period of time, and obtaining the specific direction by the compass, the second operation is an OK button provided at the user interface being pressed, and the third operation is detecting the mobile device moving.

9. The non-transitory computer-readable recording device as in claim 1, wherein the operation hardware includes the user interface and the compass, the compass detects the first operation and the third operation, the first operation is holding the mobile device still for a predetermined third period of time, and obtaining the specific direction by the compass, the second operation is an OK button provided at the user interface being pressed, and the third operation is detecting the mobile device moving.

10. The non-transitory computer-readable recording device as in claim 1, wherein the operation hardware includes the user interface, the acceleration sensor and the compass, the acceleration sensor detects the third operation, the first operation is: inputting, in the user interface, an operation for instructing to take a photography using a camera; and obtaining the specific direction by the compass, the second operation is an OK button provided at the user interface being pressed, and the third operation is detecting the mobile device moving.

11. The non-transitory computer-readable recording device as in claim 1, wherein the operation hardware include the user interface, the first operation is: sliding a fingertip in a first direction on the user interface; and obtaining the specific direction according to the first direction, the second operation is an OK button provided at the user interface being pressed, and the third operation is sliding the fingertip in a second direction opposite to the first direction on the user interface.

12. The non-transitory computer-readable recording device as in claim 1, wherein the first communication device for which the selection priority is to be raised is a device that was determined as the object device.

13. The non-transitory computer-readable recording device as in claim 1, wherein the second communication device for which the selection priority is to be lowered is a device that was not determined as the object device.

14. An information processing device comprising:

one or more processors; and a memory that stores a computer program including instructions to be executed by the one or more processors, wherein the instructions cause the one or more processors, when executed by the one or more processors, to perform:

causing a storage to store first information indicating a physical location of the information processing device;

causing the storage to further store second information indicating a specific direction which had been specified by a first operation received by an operation hardware, the operation hardware being at least one of: a compass; an acceleration sensor; and a user interface configured to receive an operation on the information processing device by a user;

causing the storage to further store third information indicating one or more location information relating to the one or more communication devices, respectively, the third information being received via the wireless network by a communication interface configured to communicate using the wireless network;

causing the storage to further store first identification information identifying a first communication device for which a selection priority is to be raised;

causing the storage to further store second identification information identifying a second communication device for which the selection priority is to be lowered;

sequentially conducting a first processing, a second processing, and a sorting processing for sorting the selection priority, the first processing including:

calculating a relative direction between the information processing device and each of the one or more communication devices based on the first information and the second information, the relative direction being a direction based on the specific direction;

assigning a selection priority to each of the one or more communication devices based on the relative direction, so that when a difference between the specific direction and the relative direction of one communication device is smaller than the difference between the specific direction and the relative direction of another communication device, the selection priority assigned to the one communication device is higher than the selection priority assigned to the another communication device; and assigning all communication devices having a difference between the specific direction and the relative direction less than a predetermined angle as specific communication devices;

the second processing including:

calculating a relative distance between the information processing device and each of the one or more communication devices based on the first information and the third information;

reassigning the selection priority to each of the one or more specific communication devices based on the relative distance so that when a relative distance of one specific communication device is smaller than the relative distance of another specific communication device, the selection priority assigned to the one specific communication device is higher than the selection priority assigned to the another specific communication device;

the sorting processing including sorting the selection priority of the one or more communication devices where when a communication device is the first communication device, the selection priority is raised by reassigning the selection priority to a higher selection priority and when a communication device is the second communication device, the selection priority is lowered by reassigning the selection priority to a lower selection priority; whereby when there are two or more communication devices, and when two communication devices are the first communication device and the second communication device, respectively, the selection priority of the first communication device is higher than the selection priority of the second communication device;

selecting one specific device to which a highest selection priority has been assigned as a temporarily selected candidate device;

controlling the communication interface such that the communication interface sends a first instruction to the temporarily selected candidate device, the first instruction being an instruction that makes the temporarily selected candidate device perform a temporarily selected state notifying action for notifying that the temporarily selected candidate device has been selected, the temporarily selected state notifying action being at least one of: lighting an indicator light of the temporarily selected candidate device; causing a panel of the temporarily selected candidate device to display a notification message; and moving a movable part of the temporarily selected candidate device; and determining the temporarily selected candidate device as an object device when: a second operation for determining the object device is received by the user interface within a predetermined first period of time; or a third operation for canceling the selection of the temporarily selected candidate device is not received by the user interface within a predetermined second period of time controlling the communication interface such that the communication interface communicates with the object device in a case where the object device is determined; and selecting another specific device to which a second highest selection priority is assigned as the temporarily selected candidate device, when: the second operation is not received by the user interface for the predetermined first period of time; or the third operation is received by the user interface or the operation hardware.

15. The information processing device as in claim 14, wherein the instructions cause the one or more processors to further perform:

controlling the communication interface to send the second instruction to terminate the temporarily selected state notifying action to the temporarily selected candidate device for having received an input to cancel the temporal selection in a case where fourth information indicating a direction that is different from the specific direction indicated by the second information is input to the operation hardware after the storage stores the second information.

16. The information processing device as in claim 14, wherein the instructions cause the computer to further perform determining a triggering condition for selecting the one specific device is satisfied in a case where a direction of the information processing device obtained by the compass provided in the information processing device is maintained substantially in the same direction over a predetermined third period of time.

17. The information processing device as in claim 14, wherein the instructions cause the computer to further perform determining a triggering condition for selecting the one specific device is satisfied in a case where an acceleration measured by the acceleration sensor provided in the information processing device exceeds a predetermined value.

* * * * *